US010191307B2

(12) United States Patent
Fujita et al.

(10) Patent No.: US 10,191,307 B2
(45) Date of Patent: Jan. 29, 2019

(54) OPTICAL TRANSMISSION DEVICE AND CONTROL METHOD THEREFOR

(71) Applicant: NEC Corporation, Minato-ku, Tokyo (JP)

(72) Inventors: Sadao Fujita, Tokyo (JP); Emmanuel Le Taillandier De Gabory, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/559,165

(22) PCT Filed: Mar. 18, 2016

(86) PCT No.: PCT/JP2016/001585
§ 371 (c)(1),
(2) Date: Sep. 18, 2017

(87) PCT Pub. No.: WO2016/152128
PCT Pub. Date: Sep. 29, 2016

(65) Prior Publication Data
US 2018/0074348 A1 Mar. 15, 2018

(30) Foreign Application Priority Data
Mar. 26, 2015 (JP) .............................. 2015-063960

(51) Int. Cl.
*G02F 1/01* (2006.01)
*H04B 10/516* (2013.01)
(Continued)

(52) U.S. Cl.
CPC ............ *G02F 1/0123* (2013.01); *G02F 1/225* (2013.01); *H04B 10/516* (2013.01);
(Continued)

(58) Field of Classification Search
CPC .. G02F 1/0123; G02F 1/225; G02F 2001/212; G02F 2001/58; H04B 10/5561
See application file for complete search history.

(56) References Cited

U.S. PATENT DOCUMENTS 7,729,621 B2* 6/2010 Nahapetian ...... H04B 10/50575
359/238
2006/0078337 A1* 4/2006 Harley ................. H04B 10/077
398/186
(Continued)

FOREIGN PATENT DOCUMENTS

JP 2007082094 A 3/2007
JP 2008197639 A 8/2008
(Continued)

OTHER PUBLICATIONS

Sotoodeh et al., Modulator Bias and Optical Power Contgrol of Optical Complex E-Field Modulators, Journal of Lightwave Technology, V. 29, N. 15, 2011.*
(Continued)

Primary Examiner — Peter Radkowski

(57) ABSTRACT

To provide a modulation control method and an optical transmission device that realize high reliability by more stably performing bias control of an optical modulator using an optical QAM scheme, an optical transmitter according to the present invention comprises a first waveguide and a second waveguide, wherein each of the first waveguide and the second waveguide are provided with an optical modulator that modulates a carrier light with a modulation driving signal that has multiple strength level values, a phase shift unit that provides a predetermined phase difference between a first optical signal outputted from the first waveguide and a second optical signal outputted from the second waveguide, a light detector that detects and photoelectrically converts a portion of a multiple value optical signal obtained
(Continued)

by multiplexing the first optical signal and the second optical signal which have been provided with the phase difference and a control circuit that, on the basis of signal amplitude information obtained by a signal amplitude detector from wideband signal components from the light detector, corrects a first voltage provided to the first waveguide and corrects a second voltage provided to the second waveguide.

14 Claims, 19 Drawing Sheets

(51) Int. Cl.
   *G02F 1/225* (2006.01)
   *H04B 10/556* (2013.01)
   *G02F 1/21* (2006.01)

(52) U.S. Cl.
   CPC ... *H04B 10/5561* (2013.01); *G02F 2001/212* (2013.01); *G02F 2201/58* (2013.01)

(56) References Cited

U.S. PATENT DOCUMENTS

| | | | |
|---|---|---|---|
| 2009/0003840 A1* | 1/2009 | Nahapetian | H04B 10/505 398/183 |
| 2014/0168741 A1 | 6/2014 | Li et al. | |

FOREIGN PATENT DOCUMENTS

| | | |
|---|---|---|
| JP | 2008249848 A | 10/2008 |
| JP | 2010028741 A | 2/2010 |
| JP | 2012247712 A | 12/2012 |
| JP | 2014516480 A | 7/2014 |

OTHER PUBLICATIONS

Zhu et al., Coherent Detection-Based Automatic Bias Control of Mach-Zehnder Modulators for Various Modulation Formats, Journal of Lightwave Technology, V. 32, N. 14, 2014.*

P.J. Winzer et al. "Generation and 1,200-km Transmission of 448-Gb/s ETDM 56-Gbaud PDM 16-QAM using a Single I/Q Modulator" ECOC 2012 PD2.2, (3 pages total).

Seiji Okamoto et al. "512 QAM (54 Gbit/s) Coherent Optical Transmission over 150 km with an Optical Bandwidth of 4.1 GHz" Research Institute of Electrical Communication, ECOC 2010, PD2. 3, 2010 (3 pages total).

R.A. Griffin "Integrated DQPSK Transmitters" Optical Society of America, Proc. of OFC/NFOEC2005, OWE3, 2005 (3 pages total).

Mohammad Sotoodeh et al. "Modulator Bias and Optical Power Control of Optical Complex E-Field Modulators" Journal of Lightwave Technology, vol. 29, No. 15, Aug. 1, 2011, pp. 2235-2248 (14 pages total).

* cited by examiner

FIG. 2
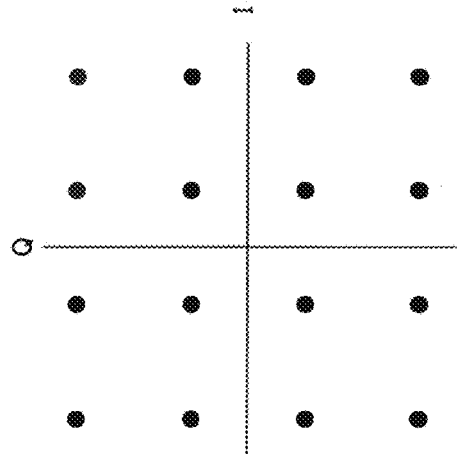
(B) CONSTELLATION OF OPTICAL TRANSMITTER OUTPUTS
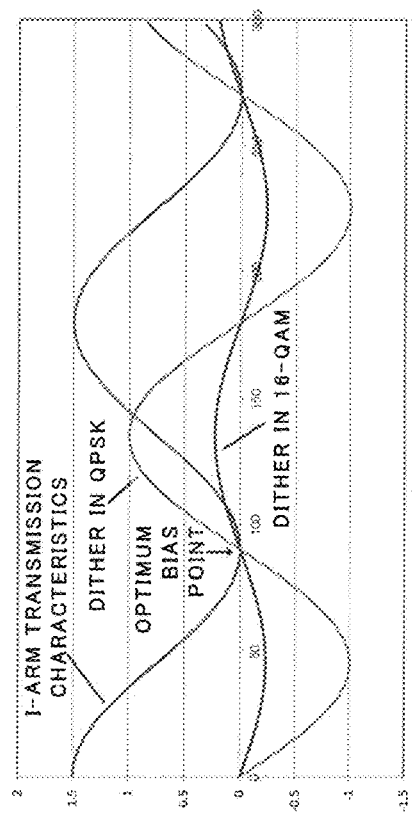
(C) DITHER DETECTION SIGNAL INTENSITY OBSERVED WITH PD MONITOR
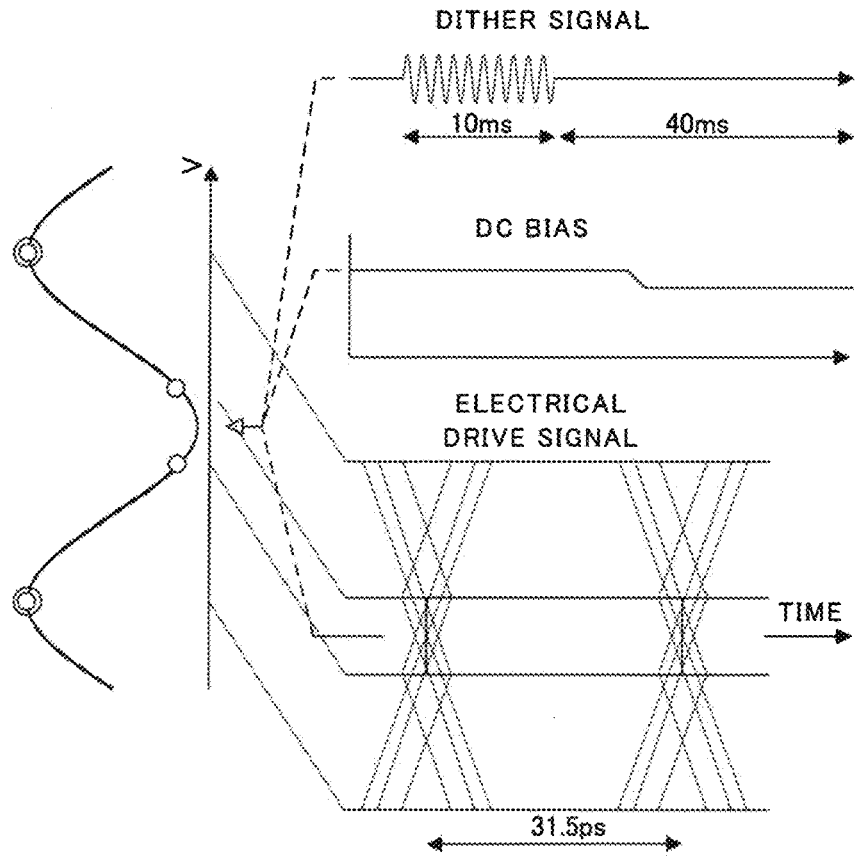
(A) I-ARM MODULATOR OPTICAL RESPONSE CHARACTERISTICS
SIGNAL APPLICATION AND DITHER DETECTION SIGNAL INTENSITY IN 16-QAM MODULATION

SYMBOLS ON I/Q AND SIGNAL COMPONENTS ON I AXIS
WHEN QUADRATURE SKEW OCCURRED

FIG. 13
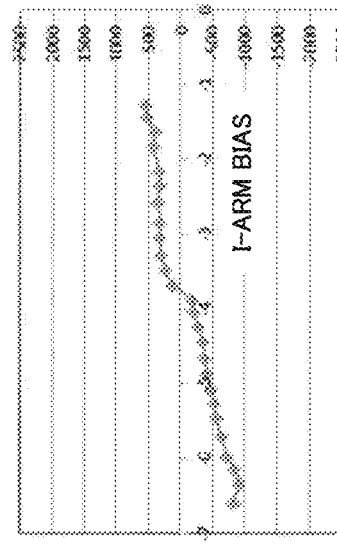
(A)
I-ARM BIAS CONTROL SIGNAL 130 OUTPUTS
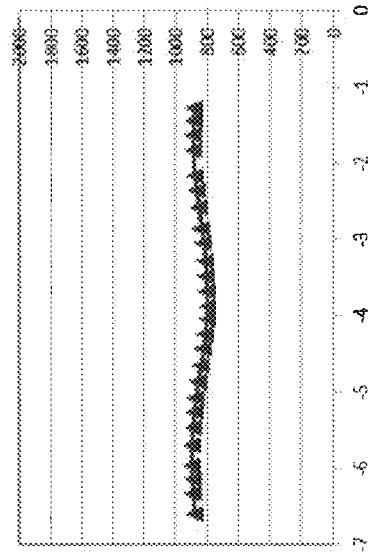
(B)
RMS DETECTION VALUE 115 OUTPUTS
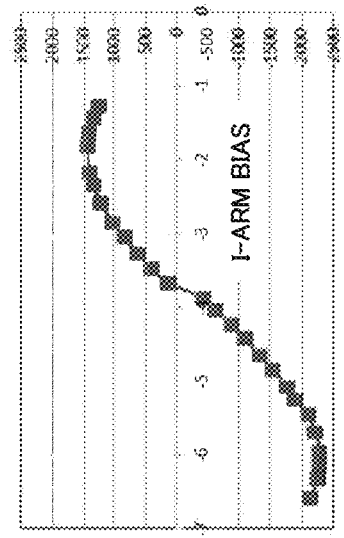
(C)
ENVELOPE DETECTION SIGNAL 116 OUTPUTS
DEPENDENCE OF OUTPUTS ON I-ARM BIAS
(I/Q QUADRATURE SKEW =0)

ABC CIRCUIT CONTROL SCHEDULE IN SECOND EXAMPLE EMBODIMENT

FIG. 18

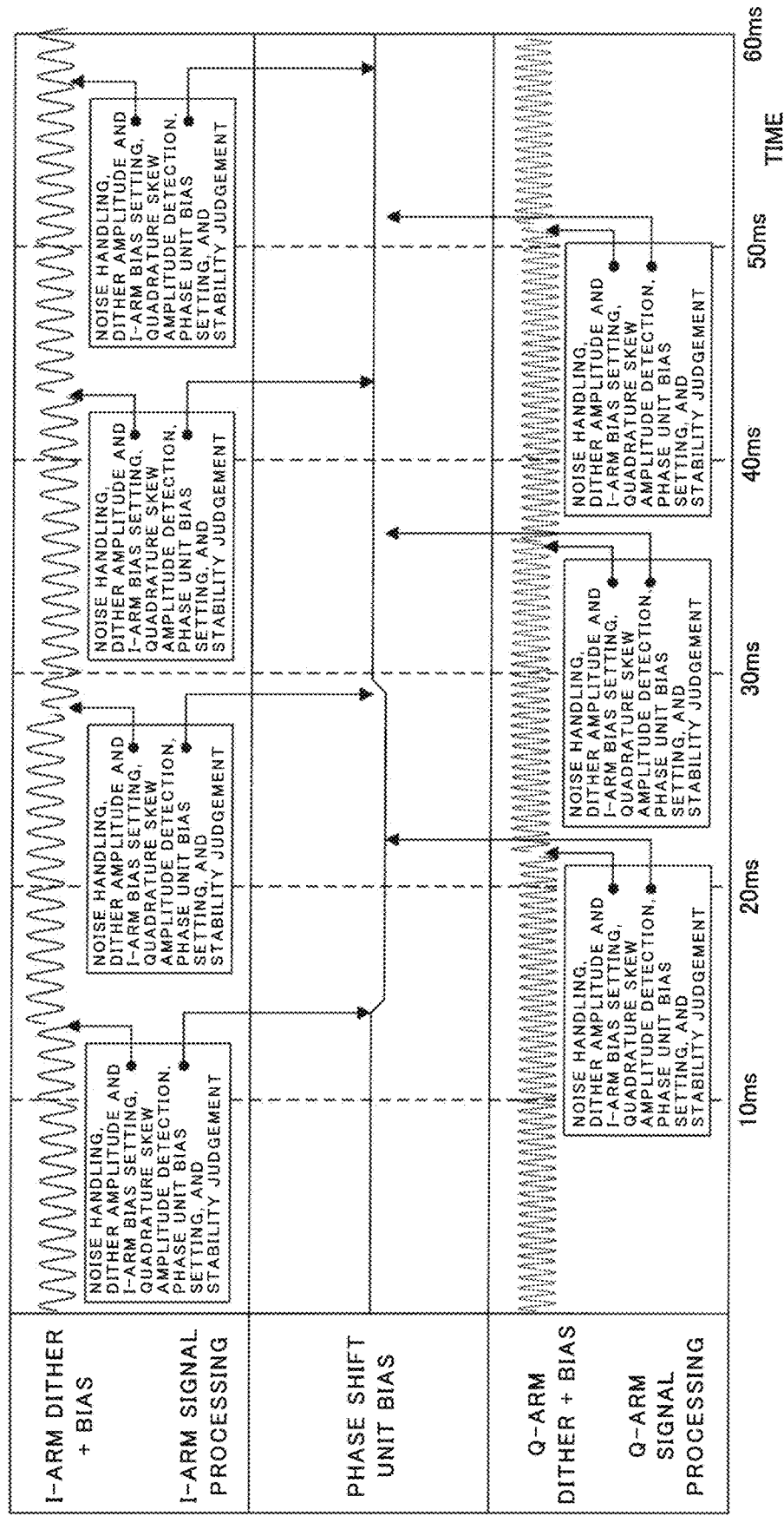

OPTICAL TRANSMISSION DEVICE AND CONTROL METHOD THEREFOR

This application is a National Stage Entry of PCT/JP2016/001585 filed on Mar. 18, 2016, which claims priority from Japanese Patent Application 2015-063960 filed on Mar. 26, 2015, the contents of all of which are incorporated herein by reference, in their entirety.

TECHNICAL FIELD

The present invention relates to an optical transmission device and a method of controlling the optical transmission device.

BACKGROUND ART

One way to optimize investment in optical fiber communications in order to cope with increase in information transmission demand in optical fiber communications is to employ a more efficient modulation scheme for transmitted information to increase the spectral efficiency.

To meet this direction, modulation schemes based on Quadrature Phase Shift Keying (QPSK), for example, have been developed for optical communication systems having larger capacities. In this case, information is encoded into four phase levels. Accordingly, 2 bits of binary signal per transmission symbol can be encoded.

Compared to a modulation scheme implemented using On-Off Keying (OOK), which encodes 1 bit per sample, the QPSK modulation technique can transmit twice the amount of information in the same required light spectrum bandwidth.

Techniques that further increase the communication capacity by improving the spectral efficacy per channel include a Quadrature Amplitude Modulation (QAM) technique, for example. In this case, a symbol is encoded into a phase level and an amplitude level and is constructed as a combination of multilevel modulations in quadrature phase. One example of the QAM scheme is disclosed in NPL 1. The modulation scheme in NPL 1 is a 16-QAM optical transmission and information is converted to 16 levels, that is, 4 bits of binary code per symbol in this case. This can double the light spectral efficiency compared to QPSK.

Further, NPL 2 discloses the use of 512-QAM. In this case, information is encoded into 512 levels, that is, 9 bits of binary code per symbol. The light spectral efficiency further increases compared to 16-QAM. The QAM scheme is therefore an efficient method of increasing the capacity of a communication line.

The QAM scheme can be implemented by using an optical In-phase/Quadrature (IQ) modulator. In the optical IQ modulator, two independent Mach-Zehnder devices are driven by electrical signals. They are called child Mach-Zehnder modulators (MZMs) (hereinafter abbreviated as "child MZMs").

The two child MAMs modulate the phase and intensity of the same optical carrier. The optical phase of one of two child MZM outputs is relatively delayed by 90 degrees before being recoupled.

The phase delay between the outputs of the two child MZMs is referred to as quadrature angle. The quadrature angle is ideally 90 degrees in the 180-degree method.

While optical IQ modulators are used in the QAM modulation scheme in NPL 1 and NPL 2, optical IQ modulators are used in the QPSK modulation scheme as well. These IQ modulators provide an efficient proven method of implementing QAM modulation.

However, IQ modulators are known to exhibit direct current (DC) bias drift due to factors such as temperature changes or aging of devices.

There are three biases affected:
DC biases of two child MZMs, and
DC bias used for setting an angle to the quadrature angle.

This is already known for QPSK modulation and, for the QAM scheme if modulators that have the same structure are used.

When a drift occurs in DC bias, the drift causes an IQ modulator to operate inaccurately. This causes degradation of transmission signals from the IQ modulator. As a result, the quality of signals at a receiving unit degrades. Or, in the worst case, it becomes impossible to decode signals received at a receiving unit.

For OOK, phase shift keying (PSK) modulation, and QPSK, these problems have been solved by using an Auto Bias Control (ABC) circuit (hereinafter simply referred to as "ABC circuit") which controls biases of modulators to compensate for variations in DC biases.

PTL 3 discloses a scheme that can be used for ABC that controls a 90-degree phase between outputs of Mach-Zehnder devices. This scheme is based on minimizing the Radio Frequency (RF) power spectrum of a modulated signal. Its basic principle is that interference between In-phase (I) and Quadrature (Q) data components enhances the RF power spectrum and therefore the quadrature angle can be controlled by minimizing the RF power spectrum.

By combining this scheme with a well-known method used for controlling the DC biases of child MZMs, the DC biases of an IQ modulator used for QPSK modulation can be controlled.

In PTL 1, the same principle as the principle in NPL 3 is used and, in addition, a dither frequency is added. The purpose is to control the quadrature angle by controlling a monitor signal for spectral components relating to the dither frequency.

Further, PTL 1 also describes in detail an ABC circuit based on dithering for controlling the DC biases of Mach-Zehnder devices. Like NPL 3, such a method is effective for QPSK. This can compensate for bias variations during operation and startup of a modulator used in QPSK.

PTL 2 indicates a configuration of an ABC circuit that is applicable to the 16-QAM modulation scheme. FIG. 1 illustrates the configuration (FIG. 1 is a diagram taken from FIG. 1 of PTL 2 without alterations).

Here, time-division switching is used to apply a low-frequency signal f0 dither to a child MZM 18I that performs modulation of an I-arm, apply the low-frequency signal f0 dither to a child MZM 18Q that performs modulation of a Q-arm, and apply the low-frequency signal f0 dither to a π/2-phase shift unit 19, an output from an optical monitor 21 of an IQ modulator 20 is synchronously detected at a synchronous detection unit 41 to increase the sensitivity of detection of each dither, and each DC bias is controlled in such a way that the dither signal becomes zero.

Further, PTL 3 discloses a configuration in which a phase shift unit provides a phase difference π/2 between an I-arm and a Q-arm, an optical receiver converts an optical output signal from a modulation unit to an electrical signal, a low-pass filter that has an cutoff frequency lower than a symbol frequency filters an output signal of the optical receiver, and a monitoring unit detects the power of an output signal of the filter, a phase-difference control unit controls a phase shift amount of the phase shift unit in such a way as to minimize the power of the filter output signal.

PTL 4 discloses a configuration in which when continuous light output from a light source is provided to a Differential Quadrature Phase Shift Keying (DQPSK) modulation unit including a phase modulation unit and a phase shift unit on each of arms A and B of a Mach-Zehnder interferometer to produce DQPSK signa light, a low-frequency pilot signal is superimposed only on a bias voltage to be supplied to either one of the phase modulation unit and the phase shift unit, whereby bias voltage control adapted to each of the phase modulation unit and the phase shift unit is performed based on the result of monitoring of signal light output from the DQPSK modulation unit.

CITATION LIST

Patent Literature

[PTL 1] Japanese Laid-open Patent Publication No. 2008-249848
[PTL 2] Japanese Laid-open Patent Publication No. 2012-247712
[PTL 3] Japanese Laid-open Patent Publication No. 2007-82094
[PTL 4] Japanese Laid-open Patent Publication No. 2008-197639

Non Patent Literature

[NPL 1] P. Winzer et al., "Generation and 1,200-km Transmission of 448-Gb/s ETDM 56-Gboud PDM 16-QAM using a Single I/Q Modulator", (ECOC 2012 PD2.2)
[NPL 2] S. Okamoto et al., "512QAM (54 Gbit/s) Coherent Optical Transmission over 150 km with an Optical Bandwidth of 4.1 GHz", (ECOC 2010, PD2.3)
[NPL 3] R. A. Griffin, "Integrated DQPSK Transmitters", Proc. of OFC/NFOEC2005, OWE3, 2005

SUMMARY OF INVENTION

Technical Problem

Analysis of the related art will be given bellow.

The ABC control scheme of the related art described with reference to FIG. 1 and others has a problem that noise caused by I/Q quadrature control skew is mixed in dither detection signals from the I-arm and the Q-arm to make bias control of the I-arm and the Q-arm unstable (a original finding by the present inventors). Details of the analysis by the present inventors will be described later.

Therefore, the present invention has been made in order to solve the problem and an object of the present invention is to provide an optical communication device and a control method that enable an IQ modulator to emit stable and highly reliable modulated optical signals.

Solution to Problem

According to one aspect of the present invention, there is provided an optical transmission device including:
an optical modulator that includes a first waveguide and a second waveguide, each of the first waveguide and the second waveguide modulating carrier light by using a modulation drive signal having multiple intensity levels;
a phase shift unit that provides a predetermined phase difference between a first optical signal output from the first waveguide and a second optical signal output from the second waveguide;
a photodetector that detects a portion of a multilevel optical signal acquired by multiplexing the first optical signal and the second optical signal between which the phase difference is provided and applies photoelectric conversion to the portion; and
a control circuit that provides a first bias voltage and a second bias voltage to the first waveguide and the second waveguide, respectively, based on an output signal from the photodetector, wherein
the control circuit includes:
a signal amplitude detector that receives an output of the photodetector and outputs signal amplitude information of the output of the photodetector; and a control unit that inputs the signal amplitude information and corrects at least one of the first bias voltage to be provided to the first waveguide and the second bias voltage to be provided to the second waveguide, based on a quadrature state between the first waveguide and the second waveguide of the optical modulator that is represented by the signal amplitude information.

According to another aspect of the present invention, there is provided a method of performing control to:
separately modulate light propagating through a first waveguide of an optical modulator and light propagating through a second waveguide of the optical modulator by using a modulation drive signal having multiple intensity levels;
provide a predetermined phase difference between a first optical signal output from the first waveguide and a second optical signal output from the second waveguide;
detect a portion of a multilevel optical signal acquired by multiplexing the first optical signal and the second optical signal between which the phase difference is provided and apply photoelectric conversion to the portion; and
provide a bias voltage to the optical modulator, based on a signal resulting from the photoelectric conversion,
wherein
the method
acquires signal amplitude information of the signal resulting from the photoelectric conversion, and
corrects at least one of a first bias voltage to be provided to the first waveguide and a second bias voltage to be provided to the second waveguide, based on a quadrature state between the first waveguide and the second waveguide that is represented by the signal amplitude information.

Advantageous Effects of Invention

The present invention enables an IQ modulator to output stable and highly reliable modulated optical signals.

BRIEF DESCRIPTION OF DRAWINGS

FIG. 2 is a diagram illustrating signal application and dither detection signal intensity in 16-QAM modulation, where (A) illustrates I-arm modulator optical response characteristics, (B) illustrates a constellation of an optical transmitter output, and (C) illustrates dither detection signal intensity observed with a PD monitor.

FIG. 13 is a diagram illustrating dependence of outputs on I-arm bias, where (A) illustrates dependence of a control signal 130 output for I-arm bias on I-arm bias, (B) illustrates dependence of an RMS detection value 115 output on I-arm bias, and (C) illustrates dependence of an envelope detection signal 116 output on I-arm bias;

FIG. 18 is a diagram illustrating a configuration of an optical transmitter in a fourth example embodiment; and FIG. 19 is a diagram illustrating an ABC circuit control schedule in the fourth example embodiment.

DESCRIPTION OF EMBODIMENTS

In the following, technical problems with the related art on which the present invention is based will be described first and then some example embodiments that solve the problems will be described. It should be noted that the following analysis has been completely newly made by the inventers and is a general outline of the invention or provides the basis for the invention.

Figure 1:
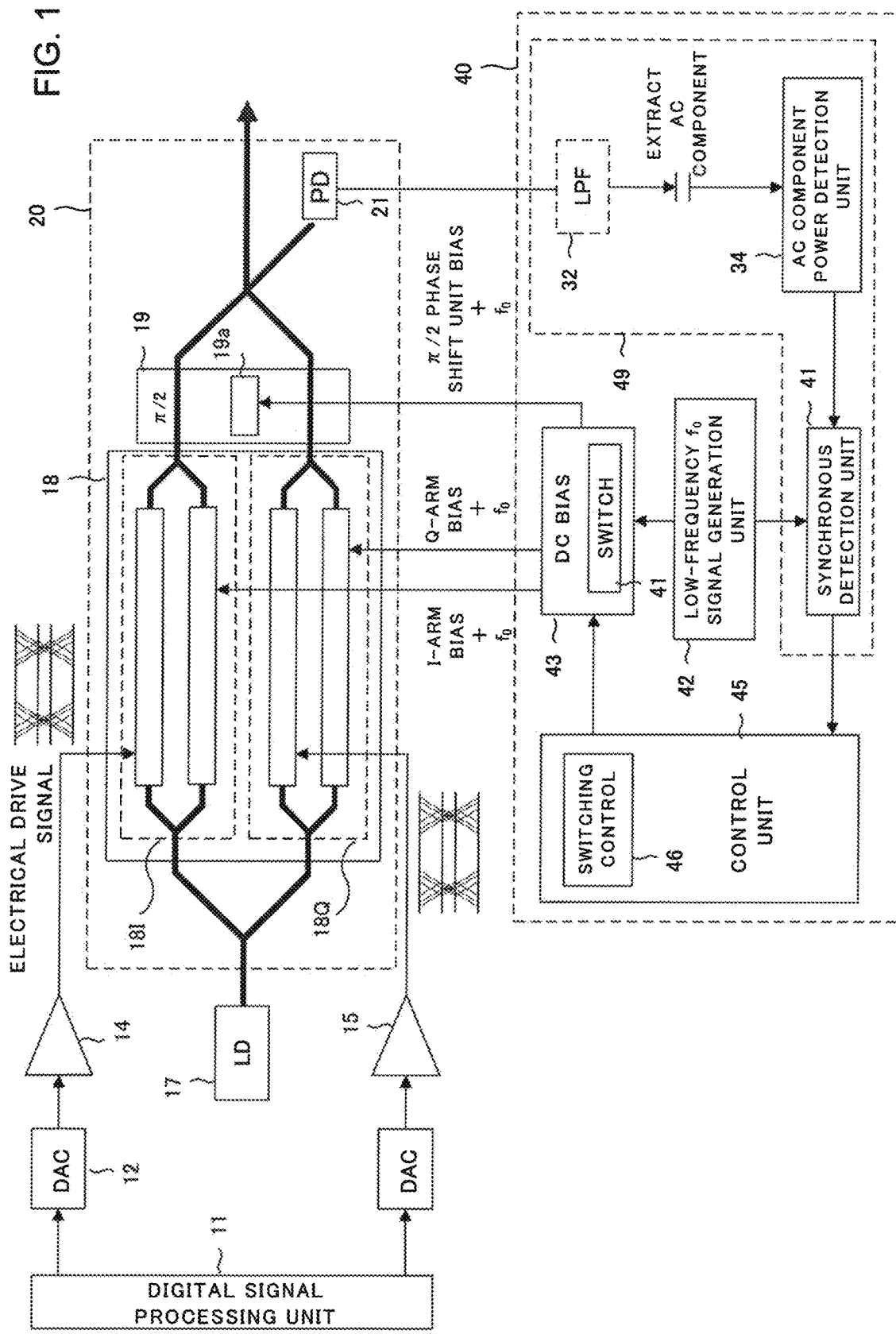
FIG. 1 is a diagram illustrating a configuration of a 16-QAM optical transmission unit of PTL 2.

The related art illustrated in FIG. 1 has a problem that the ABC circuit cannot work in an environment in which there are significant changes in temperature and high outside noise (a finding by the present inventors).

A problem with the ABC control scheme of the related art is that, while dither detection signals from the I-arm and the Q-arm in QAM modulation are minute, noise different from I-arm and Q-arm bias control is mixed in the dither detection signals from the I-arm and the Q-arm and consequently the control system becomes unstable.

The intensity of a dither detection signal in QAM modulation will be described first. This problem results from a difference between the QPSK scheme and the QAM scheme that the QPSK scheme is phase modulation using a constant amplitude whereas the QAM scheme uses a plurality of amplitudes and phases.

FIG. 2 illustrates the relationship between application of a modulation signal and a dither signal in the 16-QAM modulation and the intensity of the dither detection signal. A 4-level signal having an amplitude of 2 π (180 degrees) at its maximum intensity is applied to the I-arm.

To make distances between symbols in a constellation of 16-QAM equal, applied voltages among the 4-level signals may be set in such a way that 0 degrees, 70 degrees, 110 degrees, and 180 degrees are provided within 180 degrees in light response characteristics of the I-arm modulator. Here, the optimum DC bias is at the 90-degree point.

The double circles (◎) in the I-arm modulator light response characteristics in FIG. 2(A) represent electrical signal application points in QPSK modulation (binary).

Dither detection signal intensity which can be acquired with a Photo Detection (PD) monitor when dither signals having small amplitudes are applied under these conditions were calculated (see FIG. 2(C)).

The results show that while the dither signal is zero at the optimum bias point in the 16-QAM modulation, the dither intensity is small at the other points.

FIG. 2(C) also illustrates dither detection signal intensity in the case of QPSK modulation for comparison. The dither detection signal intensity in QPSK modulation (dither in QPSK) is five times as large as the dither detection signal intensity in 16-QAM modulation (dither in 16-QAM).

In QPSK modulation, its binary symbols (indicated by double circles (◎) in FIG. 2(A)) move in synchronization with one another on a DC bias control voltage while keeping a phase difference angle of 180 degrees. Accordingly, when deviation from the optimum bias occurs, the two symbols move in the same direction. As a result, the dither detection signal (dither in QPSK in FIG. 2(C)) becomes greater because of the summation.

In the 16-QAM modulation, on the other hand, inner two symbols (indicated by single circles (○) in FIG. 2(A)) among four-level symbols move in the direction in which the dither detection signal produced by the outer two symbols (indicated by double circles (◎) in FIG. 2(A)) is canceled and therefore the absolute value (intensity) of the 16-QAM dither detection signal (dither in 16-QAM in FIG. 2(C)) decreases.

Therefore, in ABC control in QAM moderation that uses dither, an ABC circuit needs to be configured as a control system with a good Signal to Noise (SN) ratio by removing noise other than a dither signal.

Next, the ABC control circuit illustrated in FIG. 1 has a problem that noise is mixed in a detected dither signal and therefore the control system becomes unstable. The problem will be described below.

This is a phenomenon in which a signal produced by an error in I/Q quadrature control is mixed as noise in the dither detection signal from the I-arm to prevent bias control on the I-arm.

Figure 3:
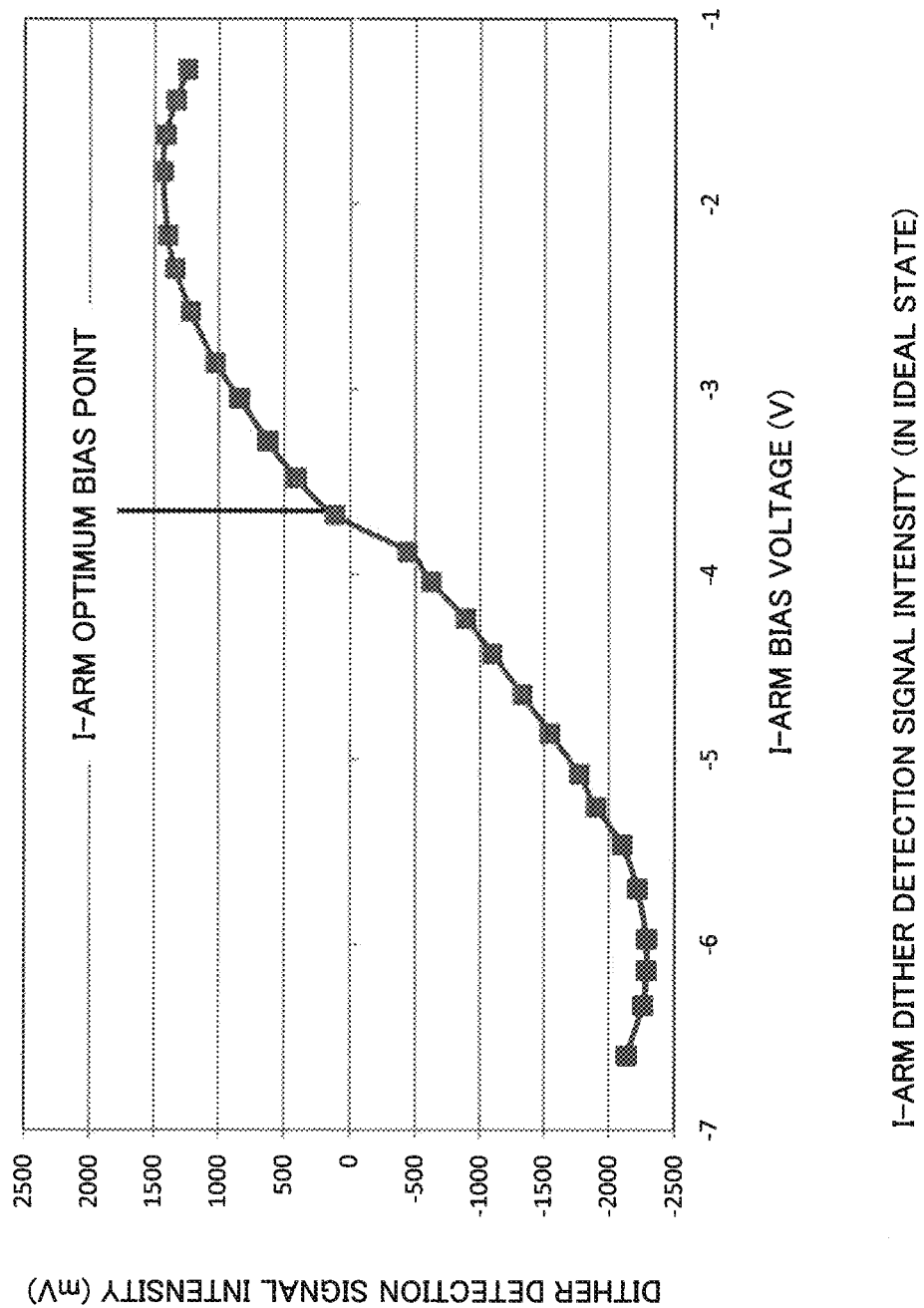
FIG. 3 is a diagram illustrating intensity of a dither detection signal of an I-arm by a bias control method when the I/Q quadrature angle is 90 degrees.

FIG. 3 presents results of the measurement of dependence of the intensity of a low-frequency f0 signal which is an output of a synchronous detection unit 41 and serves as a dither signal for I-arm bias on I-arm bias voltage. The horizontal axis of FIG. 3 represents I-arm bias voltage and the vertical axis represents dither detection signal intensity.

In the measurement, the dither signal was applied only to the I-arm 18I, no dither signal was applied to the Q-arm 18Q and the π/2 phase shift unit 19, a DC bias of the Q-arm 18Q was fixed at an optimum point, and the DC bias voltage of the π/2 phase shift unit 19 was adjusted in such a way that 4-level intensity signals modulated by the I-arm 18I and the Q-arm 18Q were orthogonal to each other.

The measurements show that the dither detection signal intensity of the I-arm detected by the synchronous detection unit 41 was zero at the optimum bias point (I-arm optimum bias point in FIG. 3).

Figure 4:
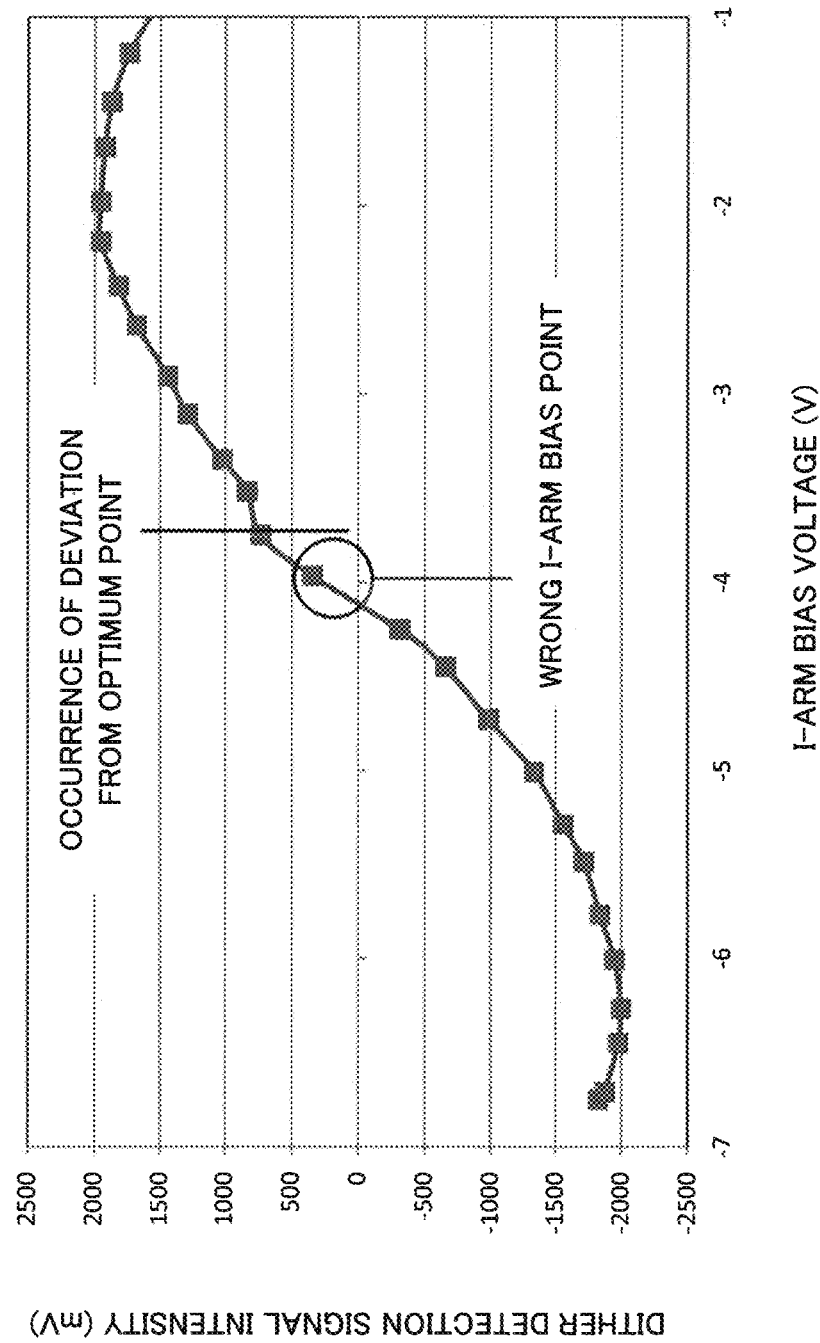
FIG. 4 is a diagram illustrating intensity of a dither detection signal of an I-arm by a well-known bias control method when the I/Q quadrature angle is 95 degrees.

On the other hand, when the orthogonal relation between an I-arm modulated signal and a Q-arm modulated signal was shifted, by 5 degrees, to 95 degrees under this condition, noise caused by the I/Q quadrature skew was mixed in the I-arm dither detection signal and the I-arm dither detection signal intensity increased to exhibit characteristics illustrated in FIG. 4.

In FIG. 4, I-arm dither detection signal characteristics as a whole shift to the left and the I-arm dither detection signal does not become zero at the I-arm bias optimum point at which four-level symbols are symmetrically arranged.

When the ABC circuit is activated in this state, the I-arm bias control point moves to a wrong I-arm bias point at which the I-arm dither detection signal intensity newly became zero due to noise contamination. As a result, degradation of transmission waveforms in 16-QAM occurs.

Figure 5:
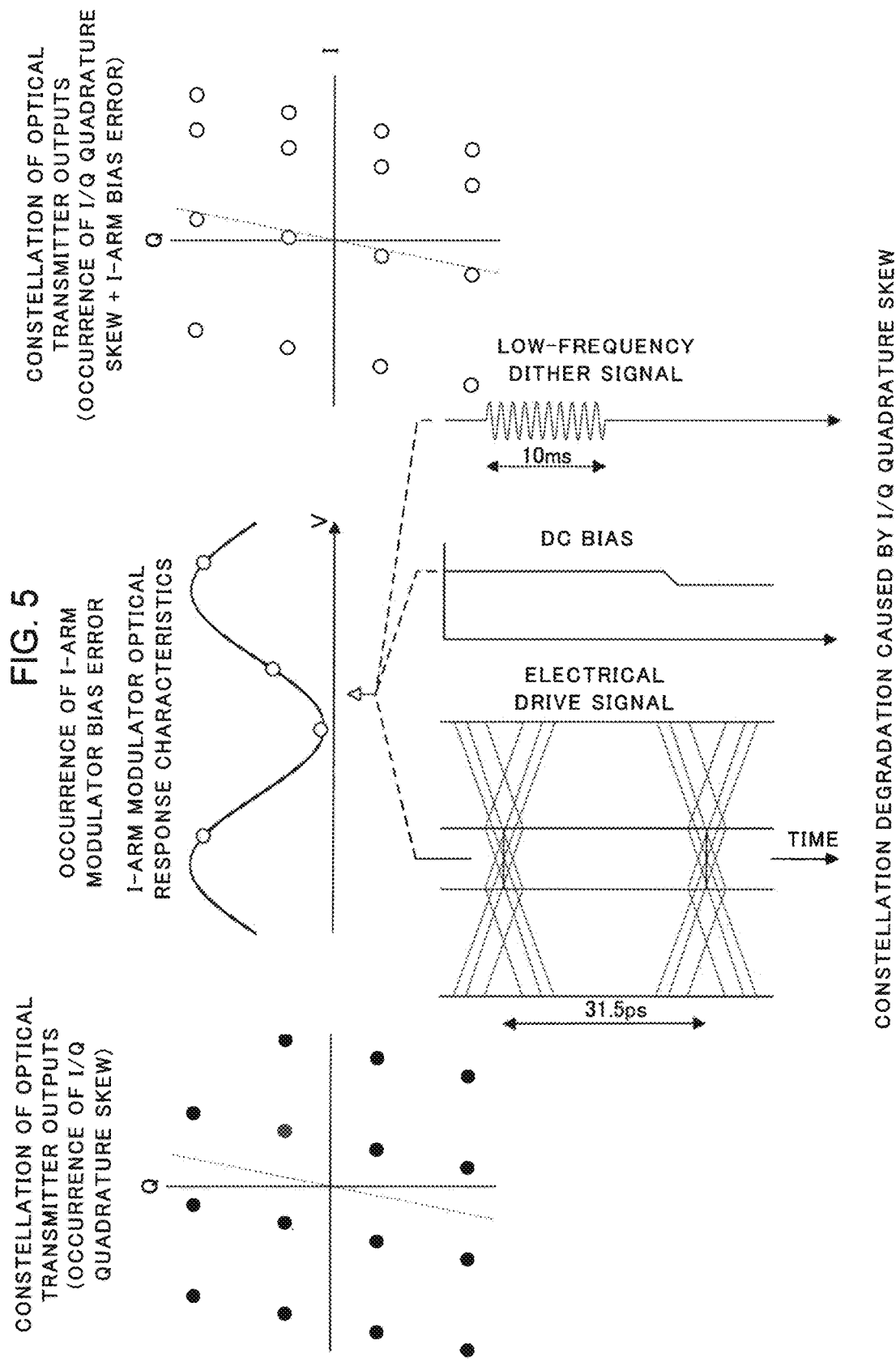
FIG. 5 is a diagram illustrating constellation degradation caused by I/Q quadrature skew, where (A) illustrates a constellation of an optical transmitter output (occurrence of I/Q quadrature skew), (B) illustrates occurrence of bias error of an I-arm modulator, and (C) illustrates a constellation of an optical transmitter output (occurrence of I/Q quadrature skew+I-arm bias error)

FIG. 5 illustrates how a 16-QAM constellation is degraded by I/Q quadrature skew. FIG. 5(A) illustrates occurrence of I/Q quadrature skew as a constellation of optical transmitter outputs. FIG. 5(B) schematically illustrates occurrence of a bias error of the I-arm modulator. FIG. 5(C) illustrates occurrence of I/Q quadrature skew and a bias error of the I-arm modulator as a constellation of outputs of the optical transmitter.

Noise is mixed in the I-arm dither detection signal due to occurrence of the I/Q quadrature skew and causes an I-arm control error to move symbol positions on the I-arm from the optimum points, leading to degradation of the whole 16-QAM constellation as a result.

The I/Q quadrature skew is a phenomenon that tends to occur in the QAM modulation scheme. Reasons are described below.

A first reason is that since an I/Q quadrature state is subjected to control, the quadrature state is always fluctuating in the negative or positive direction around a quadrature angle of 90 degrees with time.

A second reason is that the control signal for I/Q quadrature control is a signal obtained from an RF power spectrum resulting from interference between I and Q data components which is described in NPL 3 and, in order to obtain an accurate control signal, many RF power spectrums need to be collected. Therefore, the detection system uses wider bandwidth, resulting in a higher possibility of noise contamination in control and detection system from other circuits.

To stably perform I/Q quadrature control of QPSK or QAM with 32 Gboud (Giga Boud), a bandwidth greater than 250 MHz (Mega Hertz) is required for RF power detection.

The possibility of outside noise contamination is extremely high compared with the possibility in a bandwidth for I-arm dither detection which is on the order of 1 kHz (kilo Hertz).

When the control angle deviates from 90 degrees during I/Q quadrature control and, in addition, outside noise contamination occurs, noise caused by a quadrature control error is mixed in I-arm bias control, an error occurs in the I-arm bias control, and ABC control of the whole QAM becomes impossible.

Thus, the ABC control scheme of the related art has a problem that noise caused by an I/Q quadrature control error is mixed in dither detection signals from the I-arm and Q-arm and bias control of the I-arm and Q-arm becomes unstable.

Note that the control of the optical modulators of QPSK (four levels) and 16-QAM of the related art in PTL 3 and the like may be based on the assumption that control parameters for all of the three items to be controlled, that is, the I-arm, Q-arm and phase control, are independent. While the assumption that the three control items are independent presents no problem in the case of 4-level QPSK modulation, for example, the assumption does not apply to 16-QAM modulation, for example.

According to one aspect of the present invention, it is shown that accurate control of an I-arm or a Q-arm, for example, cannot be performed unless information about phase control (an I/Q quadrature state) is fed back to the control. Based on the finding that information about phase control is required for control of the I-arm and the Q-arm, for example, a correlation among the three control items is clarified. Such accurate control is required in multilevel modulation such as 16-QAM, for example (Note that the present invention is not limited to multilevel modulation such as 16-QAM, of course.).

In one mode of the present invention, a configuration in which information about one control item (phase control) among the three control items is fed back to the control of the other two control items (I-arm and Q-arm) is implemented by a control circuit that corrects first and second bias voltages to be applied to the I and Q-arms.

Example embodiments given below solve the problems described above and enable an IQ modulator to emit stable and highly reliable modulated optical signals.

First Example Embodiment

A first example embodiment is based on a finding (results of experiments by the present inventors) that since a noise component produced by I/Q quadrature skew is mixed in bias control for an I-arm or Q-arm in an optical transmitter that includes a multilevel modulation unit such as a 16-QAM modulation unit, the stability of the I-arm or the Q-arm control can be increased by observing I/Q quadrature skew concurrently and removing the noise component from a bias control signal for the I-arm or the Q-arm.

Figure 6:
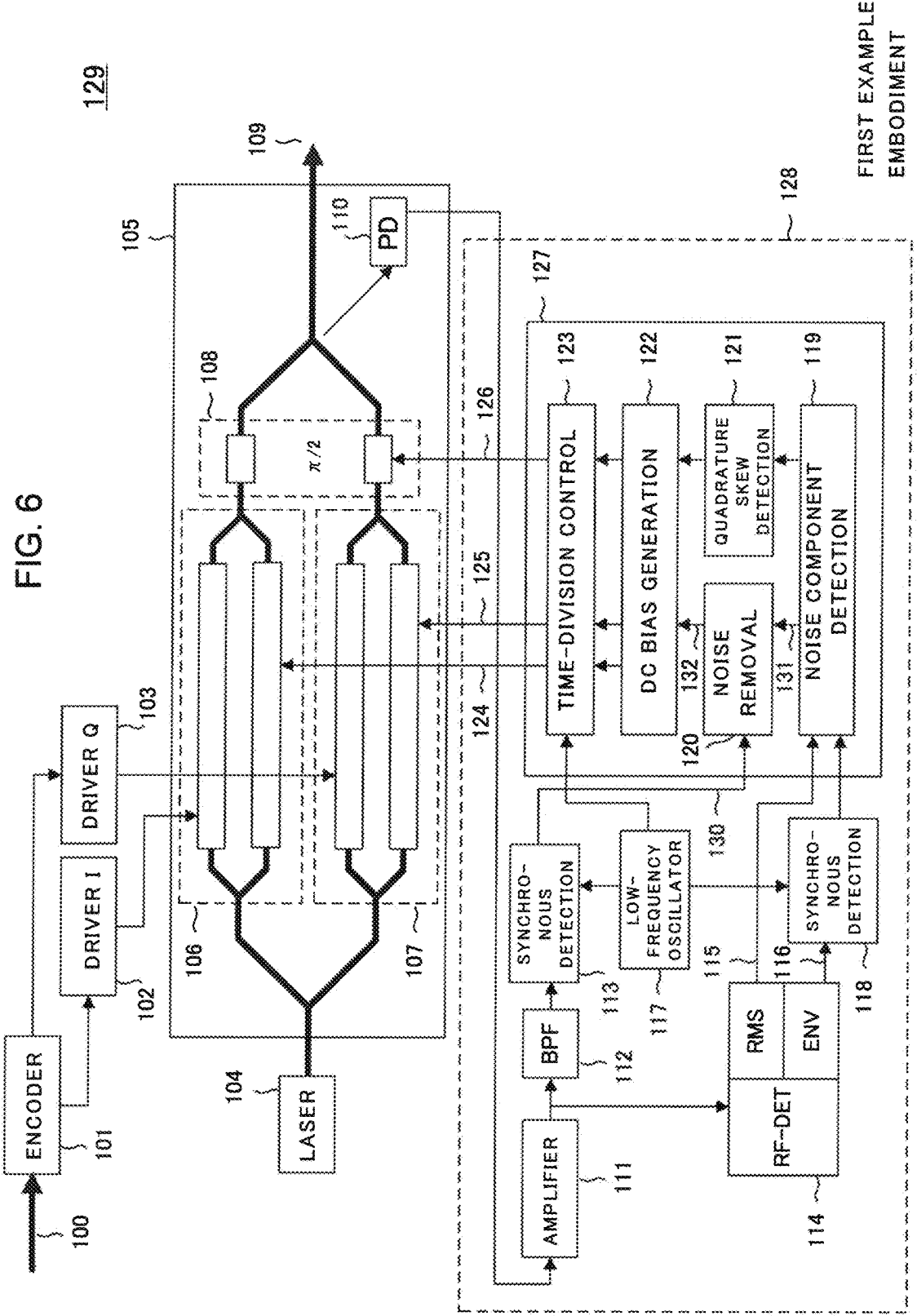
FIG. 6 is a diagram illustrating a configuration of an optical transmitter according to a first example embodiment.

FIG. 6 is a diagram illustrating a configuration of an optical transmitter 129 of a first example embodiment. In the first example embodiment, 16-QAM modulation is applied to an optical modulator (IQ modulator) 105 and a portion of its output light is extracted as a monitor signal. A control signal is generated from the monitor signal to control biases of an I-arm and a Q-arm and a bias of an optical π/2 phase shift unit 108.

The optical transmitter 129 includes a laser 104, an optical modulator (IQ modulator) 105, an encoder 101 which provides an electrical signal to the optical modulator 105, a driver I 102, a driver Q 103, and an ABC circuit 128 which controls a bias voltage of the optical modulator 105.

The optical modulator 105 includes an I-arm modulator 106, a Q-arm modulator 107, an optical π/2 phase shift unit 108, and a photodetector (photodiode: PD) 110 which monitors a portion of a modulated optical signal and performs photoelectric conversion.

The optical transmitter 129 inputs a logical binary data string 100 into the encoder 101.

The encoder 101 generates signals for an I-component and a Q-component of the optical modulator 105 in accordance with a modulation scheme of the optical transmitter 129 and the logical binary data string 100.

Two electrical signals generated by the encoder 101 are amplified by the driver I 102 and the driver Q 103 in such a way that their amplitudes become optimum for the optical modulator 105.

The laser 104 emits light in the form of a continuous wave. The continuous wave light is modulated by the optical modulator 105 in accordance with drive signals generated by the driver I 102 and the driver Q 103.

The photodetector 110, which monitors a portion of a modulated optical signal 109 output from the optical modulator 105, generates an electrical signal that is proportional to the intensity of the optical signal and provides the electrical signal to the ABC circuit 128.

The ABC circuit 128 includes, but is not limited to, a control unit 127 that uses a digital signal processor (DSP).

The control unit 127 controls direct current (DC) biases of the I-arm modulator 106 and the Q-arm modulator 107 and also controls a bias that adjusts an I/Q quadrature angle by using the optical π/2 phase shift unit 108.

The control unit 127 takes a sinusoidal signal from the low-frequency oscillator 117 as a dither signal, divides the signal by time-division, and superimposes each signal on
a bias signal 124 to the I-arm modulator 106,
a bias signal 125 to the Q-arm modulator 107, and
a bias signal 126 to the optical π/2 phase shift unit 108.

Figure 7:
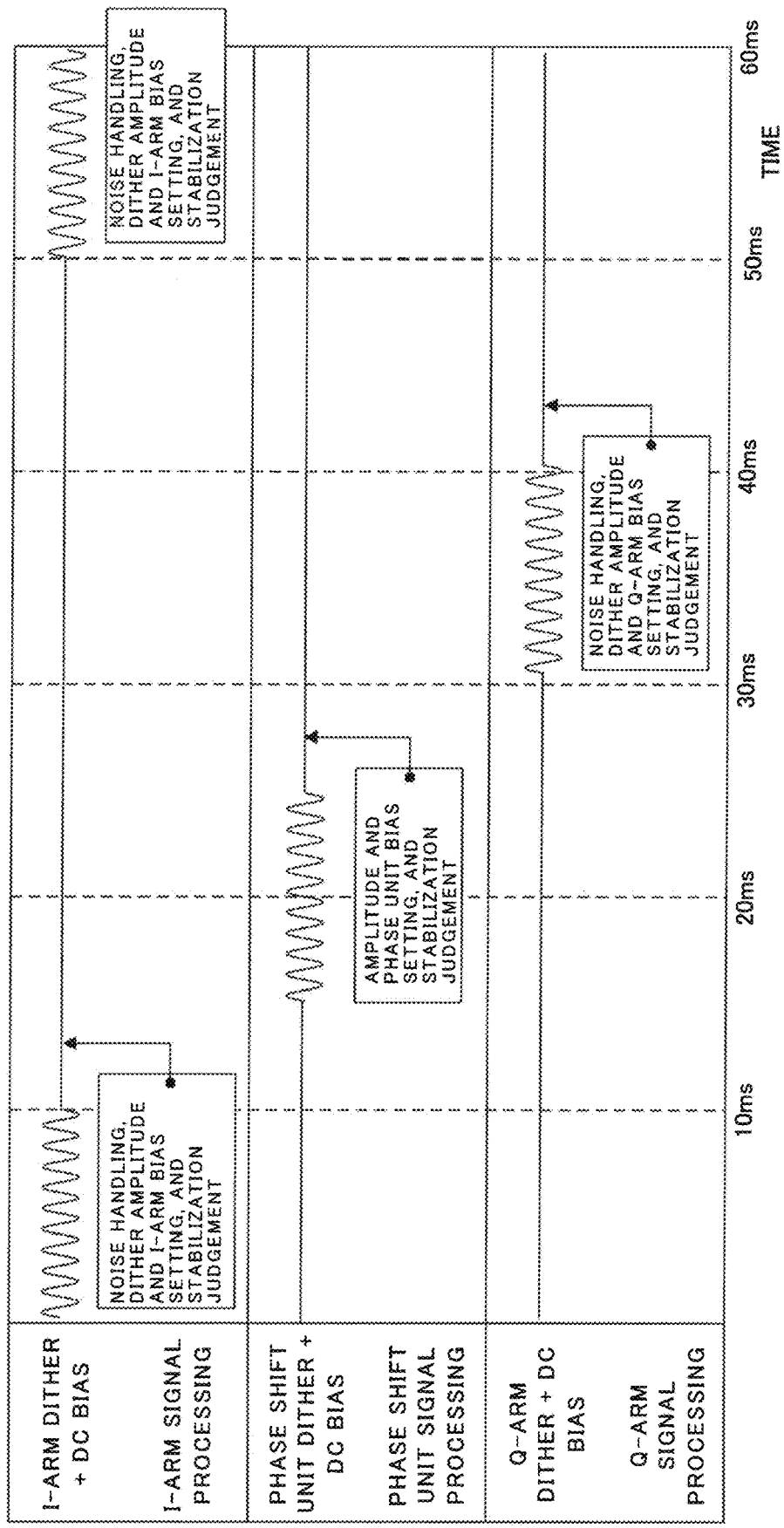
FIG. 7 is a diagram illustrating an ABC circuit control schedule in the first example embodiment.

FIG. 7 illustrates a control schedule for the three dither signals.
I-arm dither+DC bias, I-arm signal processing,
Phase shift unit dither+DC bias, phase shift unit signal processing, and
Q-arm dither+DC bias, Q-arm signal processing are illustrated.

In the present example embodiment, a frequency of 1 kHz is set for the low-frequency oscillator 117, is divided by time-division at intervals of 10 clock cycles, and is multiplexed onto each bias by time-division multiplexing. A dither signal is superimposed on each bias signal at intervals of 50 ms (milliseconds).

In the ABC circuit 128 in FIG. 6, an electrical signal from the photodetector 110 is amplified by the amplifier 111 and then a signal for control is generated.

The signal from the amplifier 111 branches and one is input into a bandpass filter (BPF) 112, where a dither signal component is extracted.

The pass-frequency of the bandpass filter 112 is set to the same value as the frequency of the low-frequency oscillator 117. The pass-frequency of the bandpass filter 112 is set at, but is not limited to, 1 kHz (kilo Hertz), for example, in the first example embodiment.

When an output from the bandpass filter 112 is detected at a synchronous detector 113 with a sinusoidal wave from the low-frequency oscillator 117, a control signal 130 for controlling the DC bias of the I-arm modulator 106 or the Q-arm modulator 107 is acquired.

Another signal branched from the amplifier 111 is input into a wideband signal amplitude detector (RF detector: RF-DET) 114 which has a bandwidth greater than or equal to 200 MHz (Mega Hertz), for example.

The signal amplitude detector 114 includes an RMS detection circuit (RMS) which detects a root mean square (RMS) that is the amplitude strength of a signal input into the signal amplitude detector 114 and an envelope detection circuit (ENV) which detects an envelope of a signal input into the signal amplitude detector 114. The RMS detection circuit (RMS) outputs an RMS detection value 115 (for example, a voltage signal) and the envelope detection circuit (ENV) outputs an envelope detection signal (envelope-signal) 116.

The output envelope detection signal 116 is input into the synchronous detector 118, where the envelope detection signal 116 is multiplied by a sinusoidal wave from the low-frequency oscillator 117 to obtain a control signal having a high SN (Signal to Noise).

The RMS detection value 115 and the envelope detection signal 116 are also signals indicating an I/Q quadrature state of the optical modulator 105.

On the other hand, when the I/Q quadrature state is skewed and the quadrature angle between I and Q deviates from 90 degrees, noise occurs in the control signal 130 that controls the DC bias of the I-arm modulator 106 or the Q-arm modulator 107.

The noise component detector 119 outputs, in a time division manner, a noise component 131 which is a signal equivalent to noise mixed in the control signal 130 and an I/Q quadrature control signal that controls the optical π/2 phase shift unit 108.

In the first example embodiment, a signal containing a noise component is retrieved through the signal amplitude detector 114 in a time period of 10 ms in which dither is applied to the I-arm modulator 106 or the Q-arm modulator 107, a signal obtained from an envelope detection signal 116 by inputting the envelope signal 116 into the synchronous detector 118 is multiplied by a constant to obtain a noise component 131, which is an output of the noise component detector 119.

The noise remover 120 removes the noise component 131 from the control signal 130 which controls a DC bias of the I-arm modulator 106 or the Q-arm modulator 107 to obtain a control signal 132 for generating a DC bias.

The noise component detector 114 is also used for controlling the optical π/2 phase shift unit 108 to perform I/Q quadrature control.

Dither is applied to the optical π/2 phase shift unit 108 in a time period between controls of the I-arm modulator 106 and the Q-arm modulator 107 and, in the time period, a quadrature skew detector 121 retrieves a dither signal through the signal amplitude detector 114. The quadrature skew detector 121 uses as an error signal of the optical π/2 phase shift unit 108 an output signal from the noise component detector 119 which is generated from the envelope detection signal 116, filters the amplitude and phase, and provides the output signal to a DC bias generation unit 122.

Based on time-divided three error signals, the DC bias generation unit 122 determines manipulated variables of control to be applied to the three control systems by Proportional-Integral-Derivative (PID) control and outputs the determined manipulated variables of the control as DC bias signals.

The time-division control unit 123 time-division-multiplexes a signal from the low-frequency oscillator 117 onto each DC bias signal to produce and provide bias signals 124, 125, and 126 to the optical modulator 105, thereby performing control.

For detection of the noise component 131, the RMS detection value 115 from the signal amplitude detector 114 and the envelope output signal 116 are used.

Figure 8:
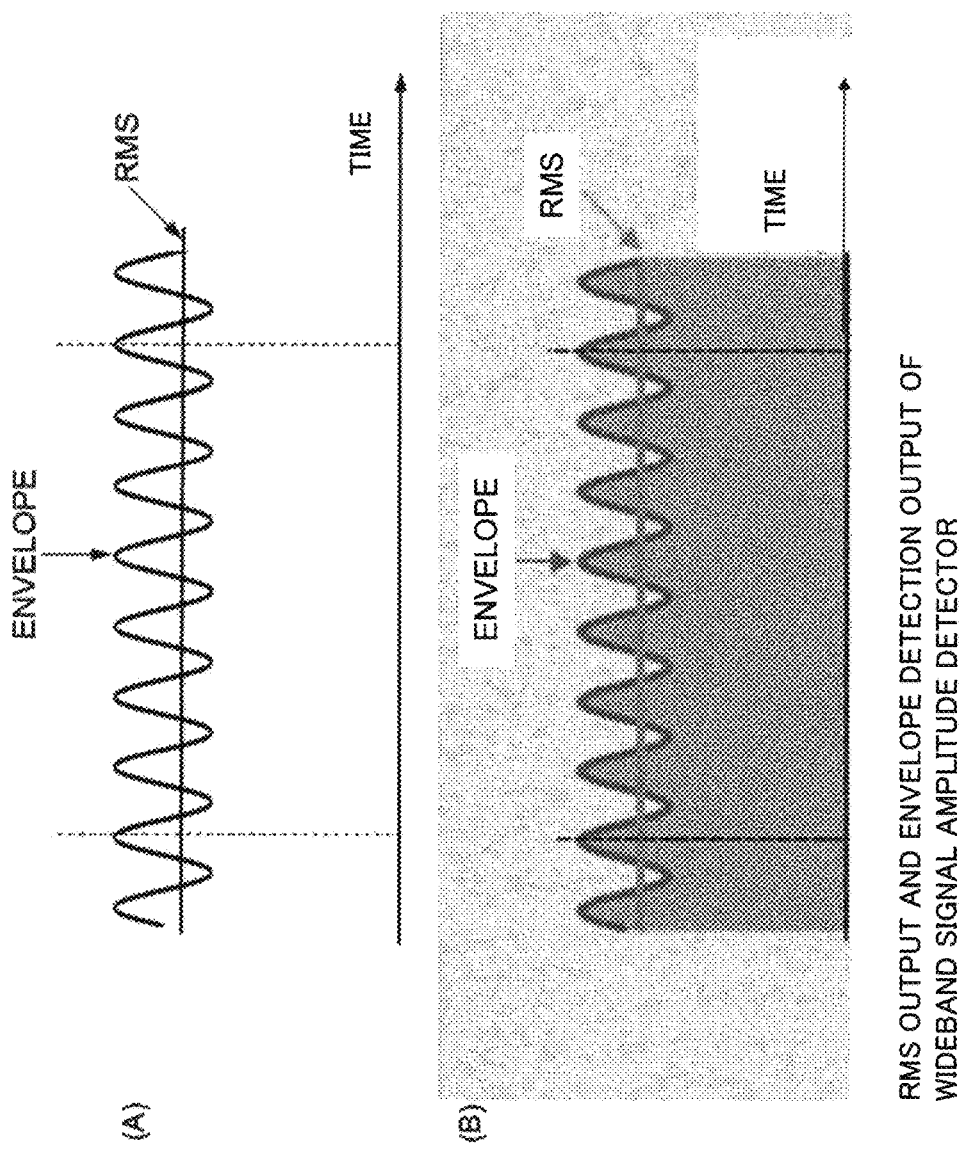
FIG. 8(A) and FIG. 8(B) are diagrams explaining an envelope detection output and an RMS value in the first example embodiment.

FIG. 8 illustrates outputs of the RMS detection values 115 and the envelope detection signal 116 (envelope-signal). An intensity component of a wideband signal over a long period of time is output in the RMS value and an envelope value of the wideband signal is output in the Envelope value. Circuits that have such functionality are integrated for mobile phone applications and are readily available.

From the RMS detection value 115 and the envelope detection signal 116, an I/Q quadrature state of the optical modulator 105 can be known.

Figure 9:
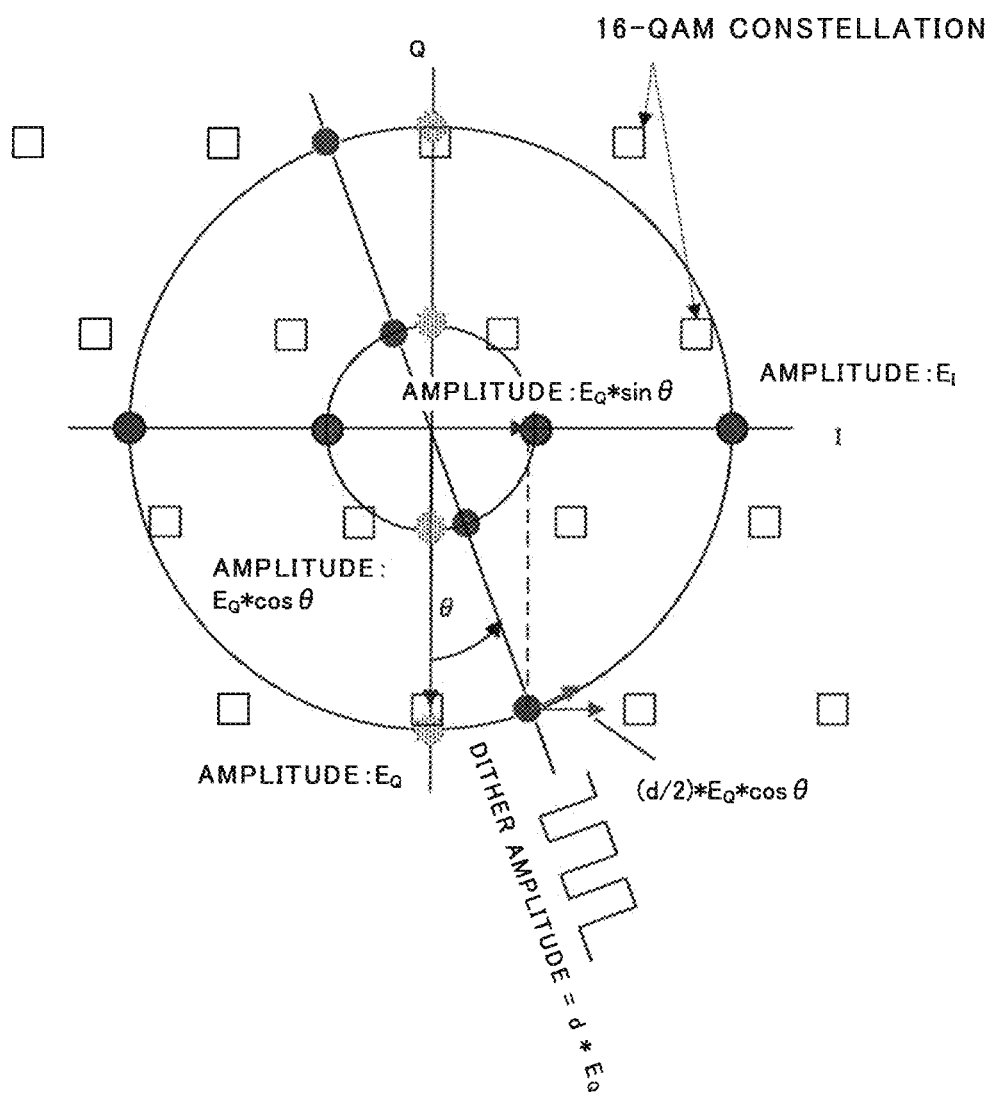
FIG. 9 is a diagram illustrating symbols on I/Q and signal components on an I-axis when quadrature skew has occurred.

FIG. 9 illustrates a symbol arrangement on the I-arm, a symbol arrangement on the Q-arm, and a constellation of 16-QAM when a quadrature skew of an angle θ occurs between I and Q.

FIG. 9 illustrates a case where a dither signal having an amplitude d is superimposed on the Q arm and a quadrature angle of the Q axis is deviated by θ degrees from an ideal value.

In this state, an RMS value of an optical signal modulated by 16-QAM is the sum of powers of 16 symbols (points represented by squares in FIG. 9).

Since power is the square value of an electric field E presented in FIG. 9, the RMS value of 16-QAM can be approximated by a power value at a symbol point with the maximum amplitude value in the 16-QAM constellation and an approximation formula of the RMS value ($I_{RMS}$) can be given by formula (1) below.

$$I_{RMS} \cong A_R(E_I^2(1+|\sin\theta|)^2 + E_Q^2|\cos\theta|^2) \quad (1)$$

Here, $A_R$ is a proportionality constant, $E_I$ is the maximum value of electric field symbols on the I axis, and $E_Q$ is the maximum value of electric field symbols on the Q axis.

On the other hand, a component that indicates detection of an envelope of a dither signal relates to power of amplitude $E_I$ on the I axis and power of a mapping component on the I axis produced by an angle skew of the Q axis, and an envelope detection signal ($I_{ENV}$) relating to the dither signal can be approximated by formula (2) given below.

$$I_{ENV} \cong A_E E_I E_Q d \sin\theta \cos\theta \quad (2)$$

Figure 10:
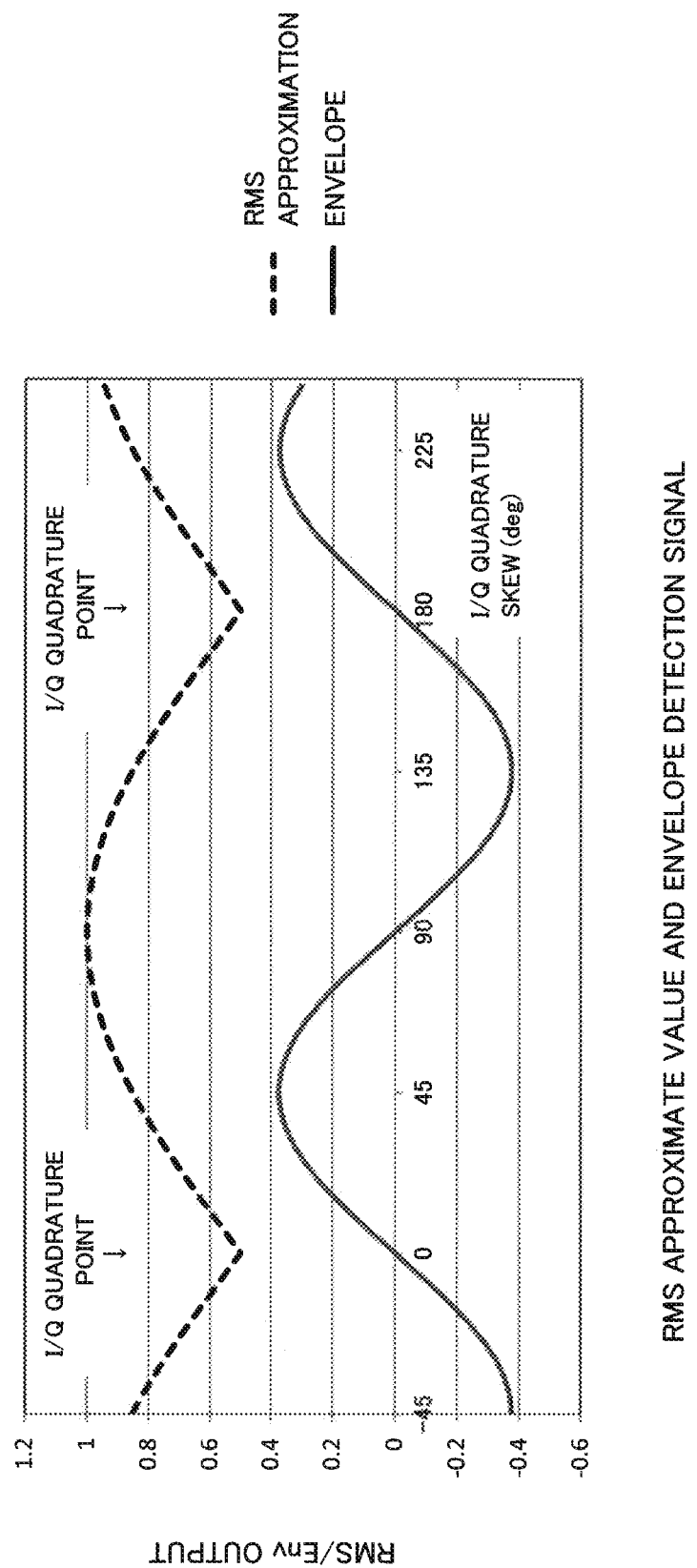
FIG. 10 is a diagram illustrating dependence of RMS and Envelope values on I/Q quadrature skew angle.

Here, $A_E$ is proportionality constant. FIG. 10 illustrates an amount of I/Q quadrature skew that represents the formula given above. In FIG. 10, quadrature holds between I and Q when I/Q quadrature skew angle=0 degrees and 180 degrees.

The RMS value (dashed curve) takes a minimum point when I and Q are in quadrature and the envelope detection signal ($I_{ENV}$) passes through the zero point when I and Q are in quadrature. By grasping the characteristics of these curves, an I/Q quadrature state can be found.

In other words, when the RMS value is observed, its minimum point represents the I/Q quadrature state.

Further, when the envelope detection signal ($I_{ENV}$) is observed, a point at which its output is zero represents the I/Q quadrature state. Note that, while the output of the envelope detection signal ($I_{ENV}$) is also zero at an I/Q quadrature skew angle of 90 degrees, symbols between I and Q are not in quadrature but in phase and the slope of the curve of the envelope detection signal is reversed.

In other words, not only the amplitude of the envelope detection signal but also phase information relating to the slope of the curve is important.

When synchronous detection with a sinusoidal wave signal from the low-frequency oscillator 117 is performed, a phase point at which outputs from the synchronous detectors 113, 118 change from negative to positive is an optimum bias point of I/Q quadrature.

A control signal 130, which is an output from the band-pass filter 112 detected by the synchronous detector 113, will be described next.

The control signal 130 is used for generating a DC bias of the I-arm modulator 106 or the Q-arm modulator 107. The control signal 130 contains a low-frequency dither signal from the low-frequency oscillator 117 and is a signal produced by time-division of control of the I-arm and the Q-arm.

A "noise component" that does not relate to bias control of the I-arm or the Q-arm is mixed in the control signal 130.

Figure 11:
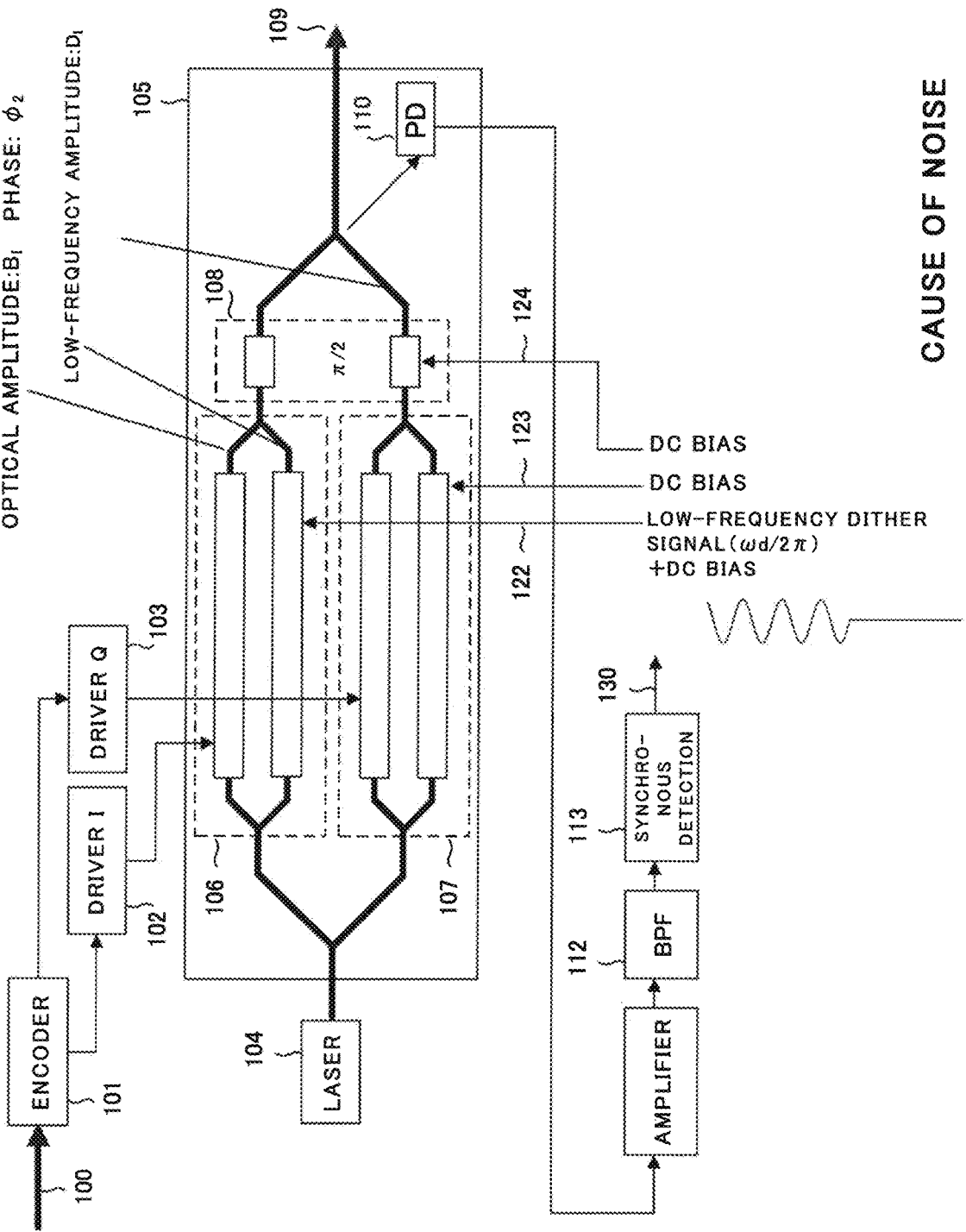
FIG. 11 is a diagram explaining a principle of the present invention.

FIG. 11 is a diagram explaining signal components contained in the control signal 130. A part of the configuration diagram of the first example embodiment in FIG. 6 is extracted and used in FIG. 11 and descriptions of signals are added to some elements.

A state at a time point when a low-frequency dither signal and a DC bias have been applied to the I-arm modulator 106 and DC biases have been applied to the Q-arm modulator 107 and the optical π/2 phase shift unit 108 is illustrated.

Further, 32 Gboud-16 QAM modulation is applied to the I-arm modulator 106 and the Q-arum modulator 107 by a driver I 102 and a driver 103.

On the other hand, since the dither signal frequency (ωd/2π) applied to the I-arm modulator is as low as 1 kHz, a modulation signal component of 16-QAM does not interfere with the control signal 130 output from the synchronous detector 113.

In FIG. 11, an optical amplitude and a phase state of each element is indicated with attention given to the 1-kHz dither signal frequency component and a drift component with a frequency equal to or less than 1 kHz.

It is assumed that a low-frequency component of one arm output of the I-arm modulator 106 has an optical amplitude $B_I$ and a phase $\phi_2$ and a low-frequency component of another arm output of the I-arm modulator 106 has a dither amplitude (low-frequency amplitude) $D_I$ and a phase $\phi_1$.

Specifically, in FIG. 11, the I-arm modulator 106 is represented as being in a state in which a continuous wave (CW) signal is leaking from the I-arm modulator 106 because of extinction ratio degradation, a bias deviated from a Null point of modulation characteristics is set for the I-arm modulator 106, and a dither signal having a frequency of 1 kHz and an amplitude $D_I$ is superimposed.

On the other hand, it is assumed that a low-frequency component of an optical signal that has passed through the optical π/2 phase shift unit 108 through the Q-arm modulator 107 has an optical amplitude $L_Q$ and a phase $\phi_3$.

This state is a state in which the optical amplitude is $L_Q$ because of leakage of CW light from the Q-arm modulator 107 due to extinction ratio degradation and leakage of CW light from the Q-arm modulator 107 due to a bias control error and the phase of the optical π/2 phase shift unit 108 due to I/Q quadrature skew is $\phi_3$.

It is assumed that in this state, three optical signals are multiplexed at a multiplexing unit after passing through the optical π/2 phase shift unit 108 and a portion of the signal is detected at the photodetector 110.

In this case, a signal component equal to or less than 1 kHz that is detected at the photodetector 110 can be given as follows. Let an output from the I-arm modulator 106 before multiplexing be electric field $E_1$ and an output from the Q-arm modulator 107 be electric field $E_2$, then $E_1$ and $E_2$ are given by formulas (3) and (4), respectively, given below. $\omega_0/2\pi$ is the oscillating frequency of the laser.

$$E_1 = D_I \sin \omega_d t \exp(j(\omega_0 t + \phi_1)) + B_I \exp(j(\omega_0 t + \phi_2)) \quad (3)$$

$$E_2 L_q \text{ext}(j(\omega_0 t + \phi_3)) \quad (4)$$

An electrical signal I(t) that can be detected at the photodetector 110 can be expressed by formula (5) given below.

$$I(t) = A|E_1 E_2|^2 \quad \text{(where A is a proportionality constant)} \quad (5)$$

The low-frequency signal component of the signal I(t) can be expressed by formula (6) given below.

$$I_b(t) = A_1(2D_I B_I \sin \omega_d t \cos(\phi_1 - \phi_2) + 2D_I L_Q \sin \omega_d \cos(\phi_1 - \phi_3 - \theta_4) + 2B_I L_Q \cos(\phi_2 - \phi_3 - \theta_4)) \quad (6)$$

Here, $\theta_4$ is a phase difference on the I-arm modulator 106 side of the optical $\pi/2$ phase shift unit 108 and $A_1$ is a proportionality constant.

Giving attention only to the frequency ($\omega d/2\pi$) of the dither signal in formula (6), then the signal $I_{bAC}(t)$ is given by formula (7) below.

$$I_{bAC}(t) = A_1(2D_I B_I \sin \omega_d t \cos(\phi_1 - \phi_2) + 2D_I L_Q \sin \omega_d t \cos(\phi_1 - \phi_3 - \theta_4)) = A_2(D_I B_I \cos \Delta\phi_I + D_I L_Q \cos \Delta\phi_{ph}) \sin \omega_d t \quad (7)$$

Here, $\Delta\phi_I$ is angle skew of the I-arm from the NULL point. $\Delta\phi_{ph}$ is a quadrature skew angle between I and Q arms. $A_2$ is a proportionality constant. Note that from $\cos(x) = \sin(x + \pi/2)$, $\Delta\phi_I = \phi_1 - \phi_2 + \pi/2$ and $\Delta\phi_{ph} = \phi_1 - \phi_3 - \theta_4 + \pi/2$.

Formula (7) given above relates to the dither signal of $\sin(\omega_d t)$ and is an item that becomes a control signal with a high signal to noise (SN) ratio by synchronous detection in synchronization with the low-frequency oscillator 117.

The first term $A_2 \cdot D_I \cdot B_I \cos(\Delta\phi_I) \cdot \sin(\omega_d t)$ of formula (7) given above is a signal component relating to bias control of the I-arm modulator 106. Normally, only this signal is acquired in order to perform bias control of the I-arm modulator 106.

On the other hand, the second term $A_2 \cdot D_I \cdot L_q \cdot \cos(\Delta\phi_{ph}) \cdot \sin(\omega_d t)$ of formula (7) can occur due to I/Q quadrature skew, where $D_I$ is the amplitude of the dither signal and $L_Q$ is caused by continuous wave (CW) light leakage due to degradation of the extinction ratio of the Q-arm modulator 107 and CW light leakage due to a Q-arm modulator 107 bias control error. The second term cannot be made 0. This is because dither cannot be stopped for control reasons. $D_I \neq 0$, there is not an ideal modulator that does not exhibit extinction ratio gradation, and DC bias control is fluctuating all the time.

Further, $L_Q \neq 0$, I/Q quadrature control is also fluctuating all the time, and $\Delta\phi_{ph} \neq 0$ because the possibility of increase in control error due to outside noise increases.

In the ABC circuit in FIG. 1, false operation occurs in control of 16-QAM because it is not knowable that noise relating to I/Q quadrature skew is mixed in a bias control signal ($I_{bAC}(t)$) of the I-arm modulator.

On the other hand, FIG. 10 shows that I/Q quadrature skew is detectable. Based on FIG. 10, a detection signal relating to I/Q quadrature skew is considered as noise and is removed by using a bias control signal of the I-arm modulator or the Q-arm modulator at the same time instant, thereby improving the quality of the control signal to enable stable control.

Results of measurement of operation of a control signal relating to the dither signal represented by formula (7) above will be described below.

Figure 12:
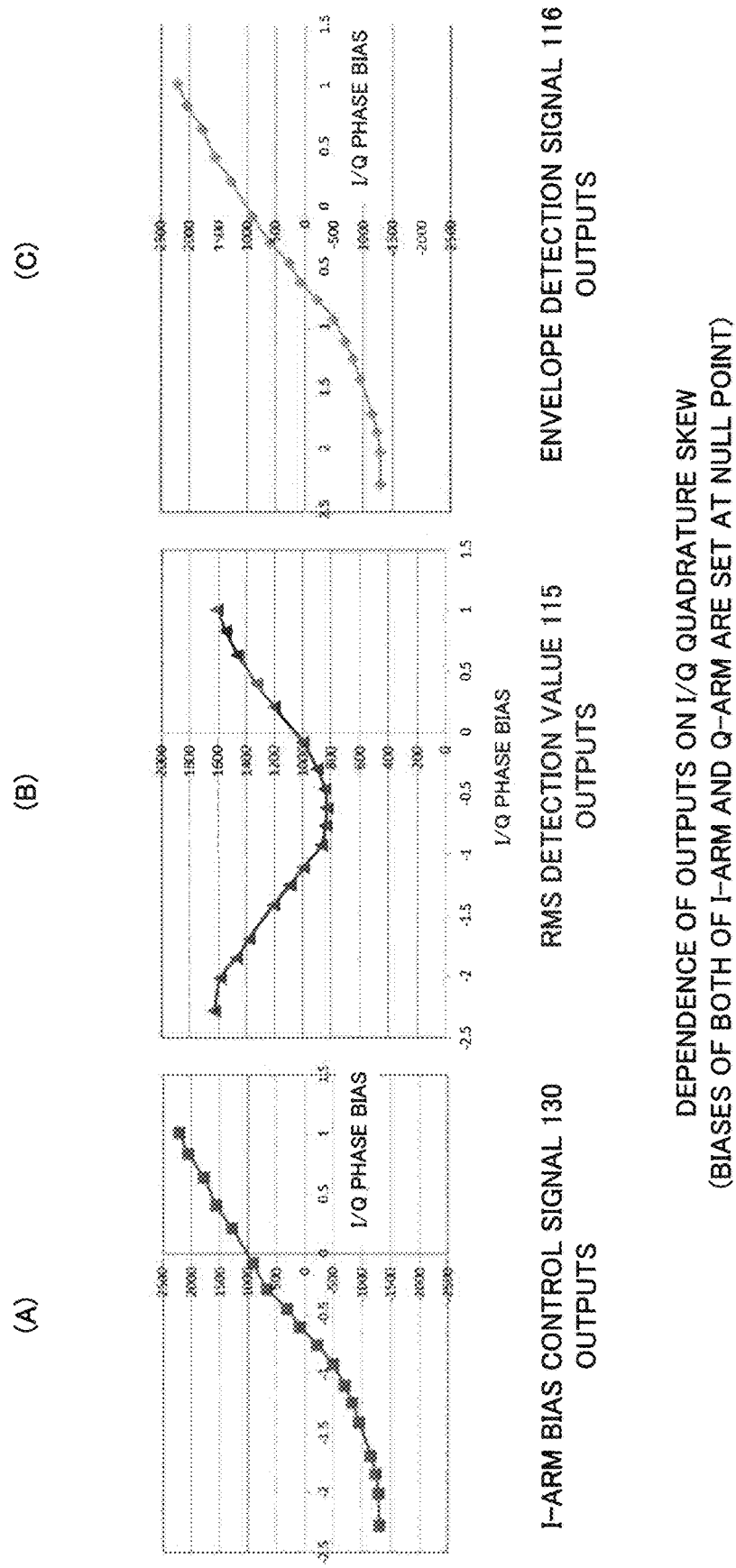
FIG. 12 is a diagram illustrating dependence of outputs on I/Q quadrature skew, where (A) illustrates dependence of a control signal 130 output for I-arm bias on I/Q quadrature skew, (B) illustrates dependence of an RMS detection value 115 output on I/Q quadrature skew, and (C) illustrates dependence of an envelope detection signal 116 output on I/Q quadrature skew.

FIGS. 12 (A), (B) and (C) illustrate results of measurement of three signals: the I-arm bias control signal 130, the RMS detection value 115, and the envelope detection signal 116.

These measurements were acquired by applying 16-QAM modulation to the optical modulator 105, applying a 1-kHz dither only to the I-arm modulator 106, stopping control of the ABC circuit 128, setting the bias of the I-arm modulator 106 at an optimum point (Null point) and the bias of the Q-arm modulator 107 at an optimum point (Null point), and changing the bias of the optical $\pi/2$ phase shift unit 108 to shift the I/Q quadrature angle.

It can be seen from the measurement result in FIG. 12(A) that despite the bias of the I-arm modulator 106 being set at the optimum point, the output of the I-arm bias control signal 130 changes as the bias (I/Q phase bias) to the optical $\pi/2$ phase shift unit 108 changes.

On the other hand, the RMS detection value 115 describes a curve with a minimum point at I/Q phase bias=−0.7 V as illustrated in FIG. 12(B).

As shown in FIG. 12(C), the envelope detection signal 116 describes a curve that passes through zero at I/Q phase bias=−0.7 V.

It can be seen from the result that the I/Q phase bias at which I and Q are in quadrature is −0.7 V. Further, it can be seen that an I/Q quadrature skew component which is noise in control appears in the I-arm bias control signal 130.

In other words, the I-arm bias control signal 130 output in FIG. 12 (A) is occupied by a noise component produced by I/Q quadrature skew represented by the second term of formula (7) given above.

FIG. 13 illustrates results of measurement made by a different measurement method from that of FIG. 12, where the I/Q phase bias was set to a quadrature state, the bias of the I-arm modulator 106 was varied and the I-arm bias control signal 130, the RMS detection value 115, and the envelope detection signal 116 were measured.

In this measurement, 16-QAM modulation was applied to the optical modulator 105, a 1-kHz dither is applied only to the I-arm modulator 106, control of the ABC circuit 128 is stopped, the bias of the Q-arm modulator 107 was set at an optimum point (Null point), the bias of the optical $\pi/2$ phase shift unit 108 was set at a quadrature point, and only the bias voltage of the I-arm modulator 106 was varied.

As can be seen from the results of the measurement in FIG. 13(A), the output of the I-arm bias control signal 130 output changes its output value as the bias of the I-arm modulator 106 changes and the zero point of the output coincides with I-arm bias=−3.8 V point at an optimum bias point in 16-QAM modulation.

On the other hand, although there is a minimum point at about −3.8 V, the output of the RMS detection value 115 is almost constant despite changes in the I-arm bias point as illustrated in FIG. 13(B).

As illustrated in FIG. 13(C), the envelope detection signal 116 passes through the zero point at about −3.8 V but its output is small compared with FIG. 12.

The correlation of the envelope detection signal 116 with the I-arm bias voltage set value is very small. In this measurement, the envelope detection signal 116 does not represent a complete straight line because of occurrence of a slight I/Q quadrature skew in the measurement time. An evidence is that the RMS detection value rises on both sides of the −3.8 V point.

From the fact that the RMS detection values 115 in FIG. 13(B) and the envelope detection signal 116 in FIG. 13(C) do not exhibit dependence on I-arm bias, it can be seen that the output of the I-arm bias control signal 130 in FIG. 13(A) is occupied by a signal component relating to bias control of the I-arm modulator 106 represented by the first term of formula (7) given above.

As illustrated in FIG. 13, if conditions under which I/Q quadrature skew does not occur can be constantly created, the I-arm bias control signal 130 can be used as a true error signal for I-arm bias control.

However, it is practically impossible to set the phase state between I and Q in quadrature at all times when the bias of the I-arm modulator is controlled.

The reason is, as described above, that fluctuating quadrature control that uses dither, influence of extinction ratio degradation of the modulators, outside noise and the like inhibit such implementation.

In the first example embodiment illustrated in FIG. 6, the noise remover 120 removes a noise component 131 from the control signal 130.

Since an output of the envelope detection signal 116 illustrated in FIG. 12 is selected and used as the noise component 131, noise caused by IQ quadrature skew can be removed. The control signal 132 relating to DC bias generation becomes an accurate error signal. As a result, stable ABC control is enabled at the I-arm modulator 106 and the Q-arm modulator 107.

In another example embodiment, control with higher accuracy can be achieved by changing signal processing at the noise component detector 119.

For example, the product of an RMS detection value 115 and a synchronous detector 118 output from an envelope detection signal 116 may be generated at the noise component detector 119 and the generated product (signal) may be input into the noise remover 120 as a noise component 131.

In this case, while the amount of computational processing increases, outside noise can be further removed from the signal of the noise component 131 to make the signal reflect an I/Q quadrature state with a higher SN and therefore the stability of ABC control can be increased.

While stabilization of control of the ABC circuit in the case of 16-QAM modulation has been described in the present example embodiment, the advantageous effect of stabilization of the ABC circuit is not limited to the 16-QAM modulation scheme.

The present example embodiment is effective in optical modulation schemes that control quadrature of light, such as 64-QAM optical modulation which has 8-level intensity variations on the I axis and the Q axis and 256-QAM optical modulation which has 16-level intensity variations on the I axis and the Q axis.

As described above, the present example embodiment enables an optical transmitter to emit stable and highly reliable modulated optical signals by using optical modulators used in a QAM scheme. The reason is as follows. In an optical transmitter that includes a multilevel modulation unit such as a 16-QAM modulation unit, a noise component caused by I/Q quadrature skew is mixed in bias control of the I-arm or the Q arm. By observing I/Q quadrature skew concurrently and removing a noise component from a signal for controlling bias of the I-arm or the Q-arm, the stability of control of the I-arm or the Q-arm can be increased.

Second Example Embodiment

Figure 14:
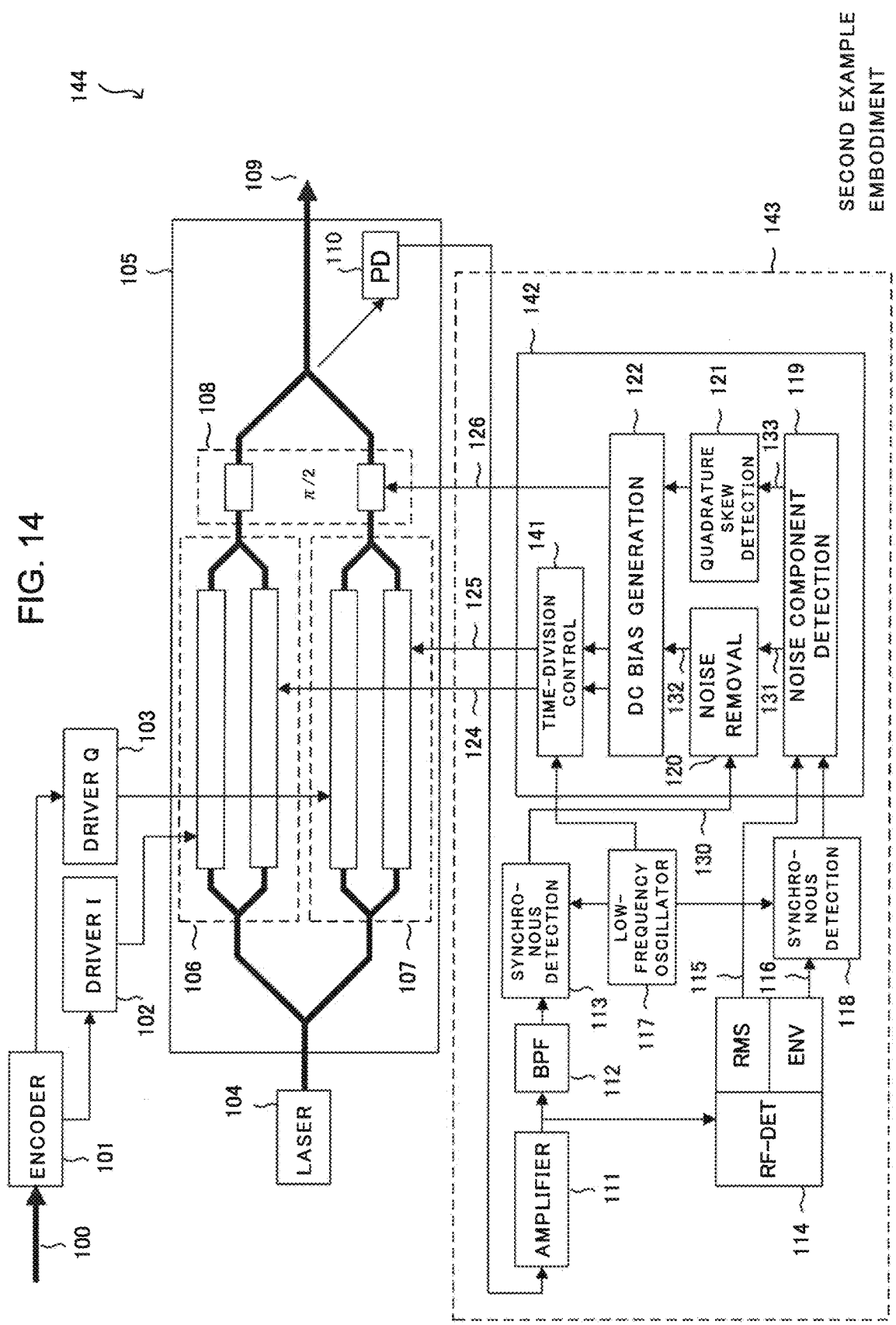
FIG. 14 is a diagram illustrating a configuration of an optical transmitter in a second example embodiment.

FIG. 14 is a diagram illustrating a configuration of an optical transmitter according to a second example embodiment. Differences form the first example embodiment in FIG. 6 are:

a method of superimposing a dither signal on an optical π/2 phase shift unit 108,
a method of acquiring a control signal for I/Q quadrature control, and
an ABC control circuit schedule.

I/Q quadrature control operation is performed along with bias control for an I-arm modulator and a Q-arm modulator, thereby reducing control sequence time and start-up time of an optical transmitter 144, and stabilizing an ABC circuit.

In FIG. 14, a dither signal cut from a signal from a low-frequency oscillator 117 is not superimposed on a bias signal 126 (bias signal 126 to an optical π/2 phase shift unit 108) output from a DC bias generation unit 122 in a control unit 142.

The dither signal is superimposed on a bias signal 124 for an I-arm modulator 106 and a bias signal 125 for a Q-arm modulator 107 that are intermediated by a time-division controller 141.

As described with reference to FIGS. 12 and 13, an I/Q quadrature state can be read from dither signals to the I-arm modulator 106 and the Q-arm modulator 107.

By monitoring an RMS detection value 115 and an envelope detection signal 116, I/Q quadrature skew can be read from the same dither signal component during bias control of the I-arm modulator 106 and the Q-arm modulator 107, and quadrature control can be performed.

In order to perform the two control operations in the same time slot, a noise component detection unit 119 of the control unit 142 outputs a noise component 131 and a control signal 132 to a noise remover unit 120 and a quadrature skew detection circuit 121 at the same timing. The noise component 131 and the control signal 132 are identical signals.

The signals (the noise component 131 and the control signal 132) are generated at the noise detection component detector 119 by multiplying an RMS detection value 115 by a synchronous detector 118 output from an envelope detection signal 116.

Figure 15:
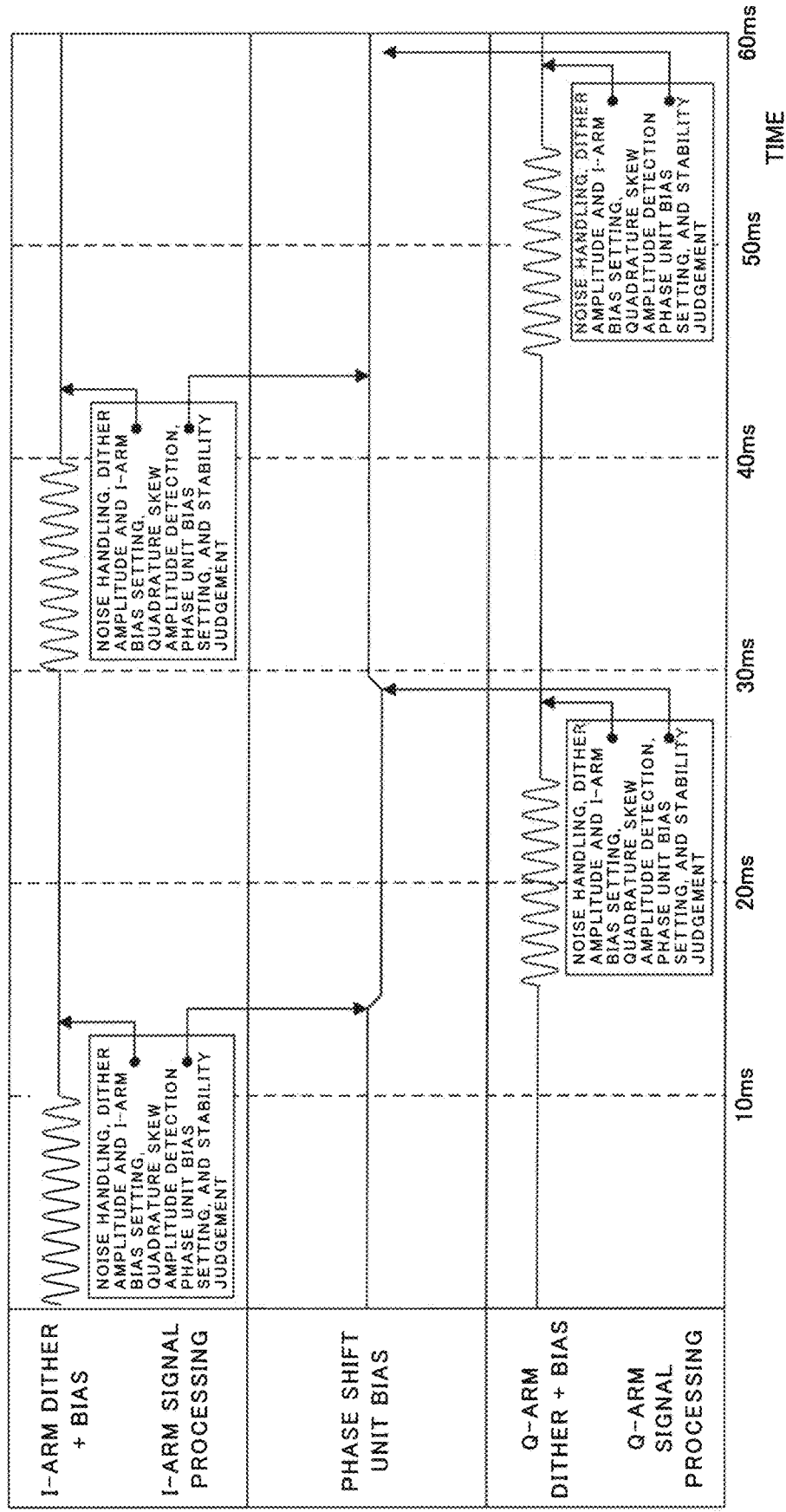
FIG. 15 is a diagram illustrating an ABC circuit control schedule in the second example embodiment.

FIG. 15 is a diagram explaining a control schedule of an ABC circuit 143 in the second example embodiment. Dither signals are applied to the I-arm modulator 106 and the Q-arm modulator 107.

In signal processing at the I-arm modulator 106, the noise component 131 is removed from the control signal 130 from an output system of a bandpass filter 112, a manipulated variable for I-arm control is determined from an amplitude value of the noiseless error signal and is output to bias of the I-arm modulator 106. At the same time, a manipulated variable for optical π/2 phase shift unit 108 control is determined from the amount of I/Q quadrature skew and is output to bias of the optical π/2 phase shift unit 108. Similar signal processing is also performed on the Q-arm modulator 107 side.

In the signal processing, dither processing time at the optical π/2 phase shift unit 108 can be saved.

Accordingly, the present example embodiment can reduce ABC circuit control time from 50 ms in the first example embodiment to 30 ms.

According to the present example embodiment, the reduction of the control time improves the accuracy of PID control.

Further, according to the present example embodiment, convergence time of the ABC circuit at start-up of the optical transmitter 144 can be reduced.

Third Example Embodiment

Figure 16:
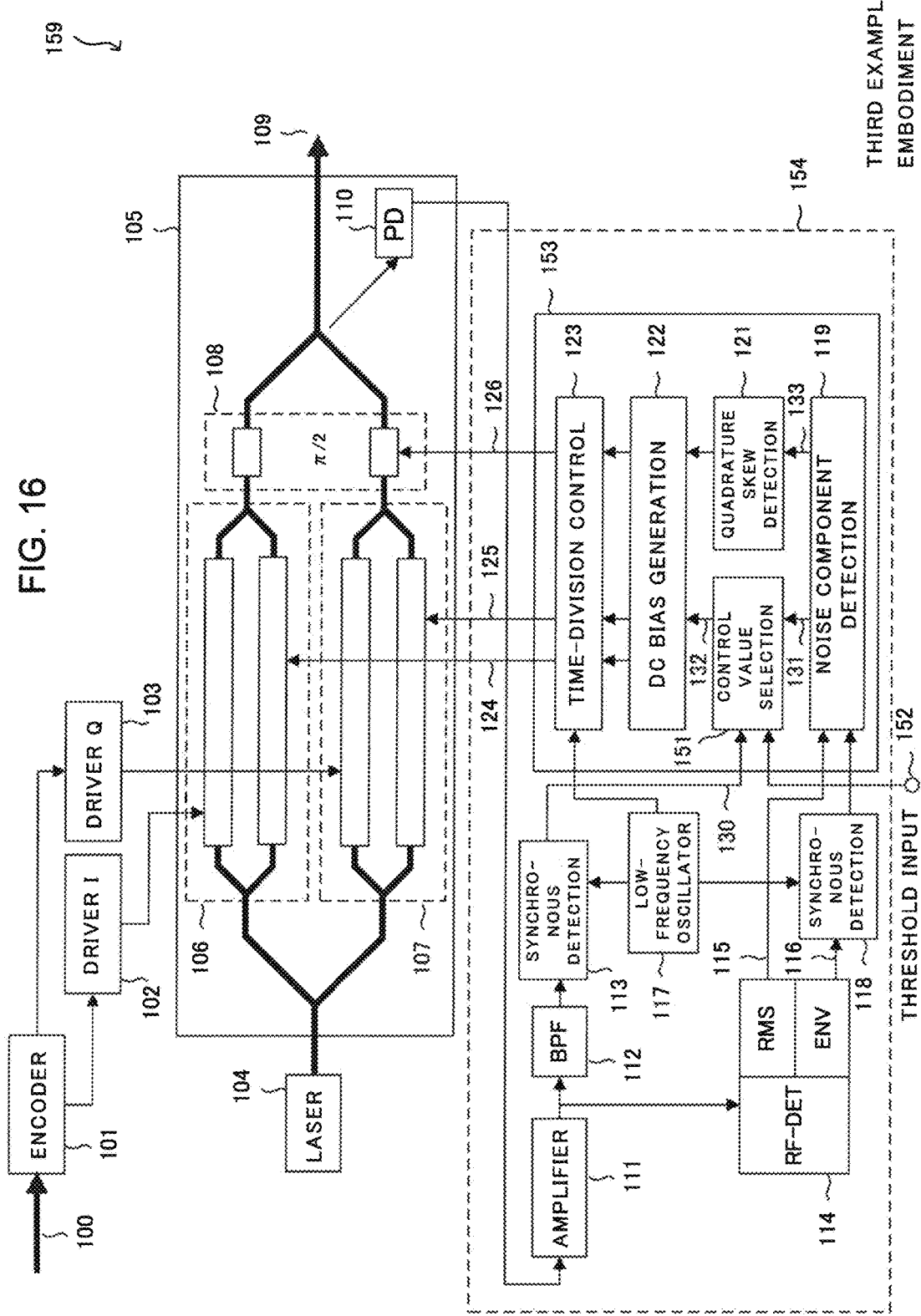
FIG. 16 is a diagram illustrating a configuration of an optical transmitter in a third example embodiment.

FIG. 16 is a diagram illustrating a configuration of an optical transmitter of a third example embodiment. The third example embodiment differs from the first example embodiment in FIG. 6 in that in place of the noise remover 120, a control value selector 151 is provided in a control unit 153 to simplify the control process of the control unit 153, thereby providing an ABC circuit 154 aimed to achieve stable operation.

In the third example embodiment in FIG. 16, an RMS detection value 115 from a signal amplitude detector 114 is selected and output as a noise component 131, which is one of outputs of a noise component detector 119 in the control unit 153. For the control value selector 151 into which the noise component 131 is input, a threshold input unit 152 is provided as another input signal source.

On the other hand, as a control signal 132, which is another output of the noise component detector 119, an envelope detection signal 116 from the signal amplitude detector 114 is selected and output. The control signal 132 is input into a quadrature skew detector 121. The quadrature skew detector 121 filters signal components and then a DC bias generation unit 122 generates a bias signal 126 for I/Q quadrature control.

Figure 17:
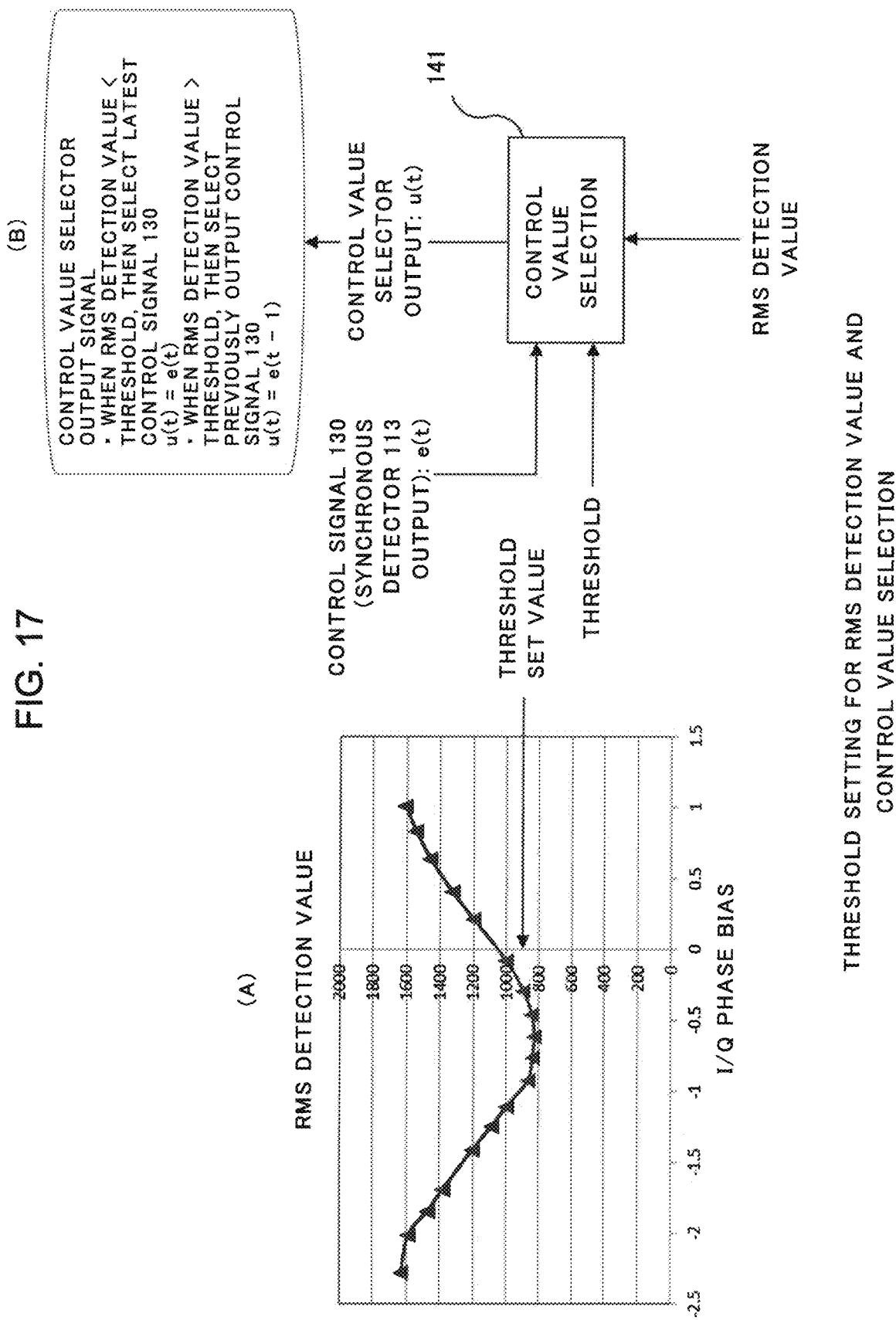
FIG. 17 is a diagram of the third example embodiment, where (A) illustrates I/Q phase bias and RMS detection values and (B) explains setting of a threshold for RMS outputs and selection of a control value.

An operation of the control value selector 151 will be described with reference to FIG. 17.

The control value selector 151 sets a threshold for an input RMS detection value and selects a control signal 130 to be output from a synchronous detector 113. As illustrated in FIG. 17(A), the threshold for the RMS detection value is set to 900 mV.

The control value selector 151 selects and outputs an output (u(t)) based on the RMS detection value 115 for a control signal 130 (an output e(t) of a synchronous detector unit 113) which is a signal input into the control value selector 151.

For example, when the RMS detection value 115 is smaller than the threshold (RMS detection value<threshold), it is determined that the I/Q quadrature is controlled to about 90 degrees and the control signal 130 contains little noise in this state, and the currently acquired control signal 130 (e(t)) is selected and output.

On the other hand, when the RMS detection value 115 is greater than the threshold, it is determined that I/Q quadrature skew has occurred and noise is mixed in the control signal 130, and a control signal 130 (e(t−1)) previously output in the previous time slot is output again. The above description can be rewritten as follows.

(1) When RMS≤threshold, then output u(t)=e(t)
(2) When RMS>threshold, then output u(t)=e(t−1)

In the state (2) given above where there is large noise, the control signal acquired in the state is not used but is discarded and the previous value, which is likely to provide more certain control, is used again. This offers an integral effect on the control system and stabilizes the control system. When control is disrupted by disturbance or the like, for example, it takes time to return to a target control point. However, the integral action advantageously works to facilitate setting of the control system and therefore can readily stabilize the control system.

The third example embodiment in FIG. 16 employs a control method that uses the control value selector 151. Time-divided dither signals are superimposed on three bias signals 124, 125, and 126 to be provided to the optical modulator 105 and the control schedule for the ABC circuit is the same as that in the first example embodiment as illustrated in FIG. 7. An optical π/2 phase shift unit 108 is stably controlled in accordance with the control schedule.

If the I/Q quadrature state does not change during control of the I-arm or the Q-arm and the noise component is less than or equal to a set threshold, a manipulated variable based on the latest error signal is applied to the control of the I-arm or the Q-arm. Accordingly, the control works toward an optimum point.

When the I/Q quadrature state is skewed during control of the I-arm or the Q-arm and a noise component exceeds the set threshold, a manipulated variable is not applied to the control of the I-arm or the Q-arm and the previous value is used. I/Q quadrature control at the optical π/2 phase shift unit 108 is accurately adjusted again and then the I-arm or the Q-arm is controlled again.

Since the control system as described above includes selection of an error signal and integral action, the PID control system can be set by simple constant setting. In addition, stable operation can be provided.

Fourth Example Embodiment

Figure 18:
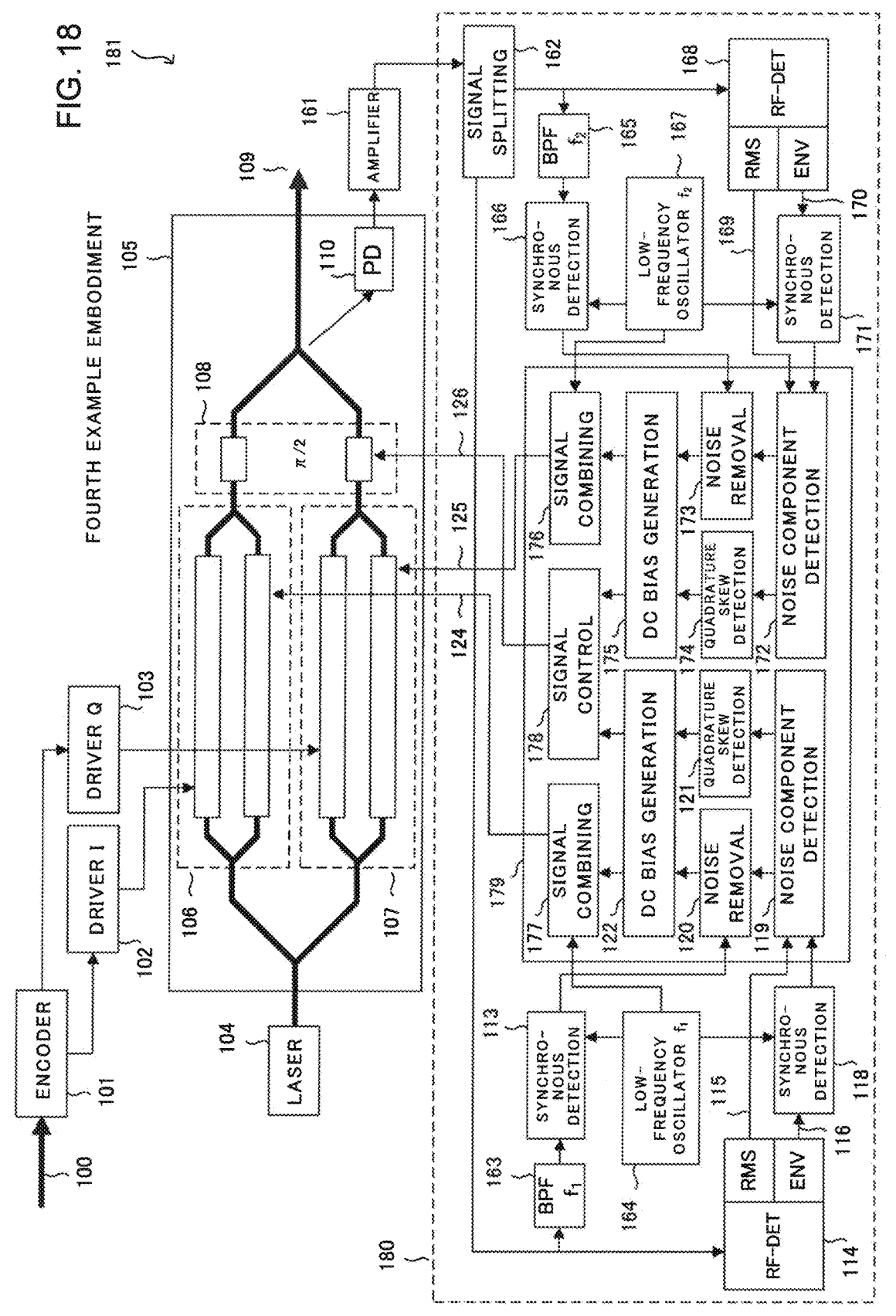

FIG. 18 is a diagram illustrating a configuration of an optical transmitter of a fourth example embodiment. Referring to FIG. 18, in an optical transmitter 181 in the fourth example embodiment, an I-arm and a Q-arm are controlled by separate control systems to speed up ABC control.

Further, the form of a control schedule in the fourth example embodiment is based on the control schedule of the second exemplary embodiment, where I-arm control and I/Q quadrature control are concurrently performed and, at the same time, Q-arm control and I/Q quadrature control are concurrently performed.

In order to perform the two control operations concurrently, two sets of control system components for the I-arm system and the Q-arm system are used and different frequencies, f1, and f2, are set for two low-frequency oscillators provided in order to prevent dither signal interference between the two controls.

The following description of the present example embodiment will focus on an ABC circuit 180, which has a configuration different from that of the second example embodiment described above.

An electrical signal output from a photodetector 110 that monitors a portion of light of a modulated optical signal 109 is amplified by an amplifier 161, then split into two signals by a signal splitter 162, and the signals are provided to the two control systems for the I-arm and the Q-arm.

A bandpass filter (BPF) 163 is used for detecting dither for the I-arm. In the present example embodiment, the center frequency f1 of the band-pass filter (BPF) 163 is set at, but is not limited to, 1 kHz.

Further, the oscillating frequency f1 of a low-frequency oscillator 164 is also set at f1=1 kHz.

A noise component detector 119 for the I-arm selects a synchronous detector 118 output from an envelope detection signal 116 and provides the synchronous detector 118 output to a noise remover 120 and a quadrature skew detector 121.

A DC bias generator 122 for the I-arm outputs a DC bias signal for the I-arm, which is combined with a sinusoidal signal from the low-frequency oscillator 164 at a signal combiner 177 to become a bias signal 124 for the I-arm modulator 106.

Further, a control signal for I/Q quadrature control which is output from the DC bias generator 122 is input into a signal controller 178. A control signal for I/Q quadrature control which is output from a DC bias generator 175 on the Q-arm side is also input into the signal controller 178.

The signal controller 178 controls time-division combining in such a way that two control signals for I/Q quadrature control alternately appear, and provides its output to an optical π/2 phase shift unit 108 as a bias signal 126.

A bandpass filter (BPF) 165 having a center frequency f2 is used in the control system for the Q-arm. In the present example embodiment, the center frequency f2 is set at 6 kHz.

Further, the oscillating frequency of a low-frequency oscillator 167 is also set at f2=6 kHz.

A noise component detector 172 for the Q-arm selects a synchronous detector 171 output from an envelope detection signal 170 and provides the synchronous detector 171 output to a noise remover 173 and a quadrature skew detector 174.

The DC bias generator 175 for the Q-arm outputs a DC bias signal for the Q-arm, which is combined with a sinusoidal signal from the low-frequency oscillator 167 at a signal combiner 176 to become a bias signal 125 for the Q-arm modulator 107.

Further, a control signal for I/Q quadrature control from the DC bias generator 175 is input into the signal controller 178.

The signal controller 178 controls time-division combining in such a way that control signals for quadrature control for the I-arm system and quadrature control for the Q-arm system alternately appear, and provides its output to the optical π/2 phase shift unit 108 as a bias signal 126.

FIG. 19 is a diagram explaining a control schedule for the ABC circuit in the fourth example embodiment.

A control unit 179 can manage dither signal reading, computational processing, and timing processing for bias setting in the I-arm system and the Q-arm system, can perform bias control for the I-arm and the Q-arm at intervals of approximately 10 ms, and can perform bias control for the optical π/2 phase shift unit 108 at intervals of 5 ms. Consequently, speeding-up of the ABC circuit is achieved.

The speeding-up of the control has the advantageous effect of improving the resistance of control against outside noise. Further, the speeding-up can reduce convergence time at the startup of the ABC circuit and offers many advantages.

The optical transmitters of the example embodiments described above can be applied to an optical communication system that uses a multilevel modulation scheme.

Note that the disclosures of the patent literatures and the non-patent literatures given above are incorporated herein by reference. Modifications and adjustments can be made to the example embodiments or examples within the scope of the overall disclosure (including claims) of the present invention and based on the basic technical idea of the present invention. A wide variety of combinations or selections of various disclosed elements (including the elements of the claims, the elements of the examples, the elements in the drawings, and the like) are possible within the scope of the claims of the present invention. In other words, it would be understood that the present invention includes various variations and modifications that could be made by those skilled in the art in accordance with the whole disclosure including the claims and the technical idea.

This application is based upon and claims the benefit of priority from Japanese Patent Application No. 2015-063960, filed on Mar. 26, 2015, the entire disclosure of which is incorporated herein.

REFERENCE SIGNS LIST

100 Logical binary data string
101 Encoder
102 Driver I
103 Driver Q
104 Laser
105 Optical modulator
106 I-arm modulator
107 Q-arm modulator
108 Optical π/2 phase shift unit
109 Modulated optical signal
110 Photodetector
111 Amplifier
112 Bandpass filter
113, 118 Synchronous detector
114 Signal amplitude detector
115 RMS detection value
116 Envelope detection signal
117 Low-frequency oscillator
119 Noise component detector
120 Noise remover
121 Quadrature skew detector
122 DC bias generation unit
123 Time-division control unit
124, 125, 126 Bias signal
127 Control unit
128 ABC circuit (Auto Bias Control circuit)
129 Optical transmitter
130 Control signal
131 Noise component
132 Control signal
141 Time-division controller
142 Control unit
143 ABC circuit (Auto Bias Control circuit)
144 Optical transmitter
151 Control value selector
152 Threshold input unit
153 Control unit
154 ABC circuit (Auto Bias Control circuit)
159 Optical transmitter
161 Amplifier
162 Signal splitter
163 Bandpass filter (BPF)
164 Low-frequency oscillator
165 Band pass filter (BPF)
166 Synchronous detector
167 Low-frequency oscillator
168 Signal amplitude detector
169 RMS detection value
170 Envelope detection signal
171 Synchronous detector
172 Noise component detector
173 Noise remover
174 Quadrature skew detector
175 DC bias generator
176, 177 Signal combiner
178 Signal controller
179 Control unit
180 ABC circuit (Auto Bias Control circuit)
181 Optical transmitter

What is claimed is:

1. An optical transmission device comprising:
   an optical modulator configured to include a first waveguide and a second waveguide, each of the first waveguide and the second waveguide modulating carrier light by using a modulation drive signal having multiple intensity levels;
   a phase shifter configured to provide a predetermined phase difference between a first optical signal output from the first waveguide and a second optical signal output from the second waveguide;

a photodetector configured to detect a portion of a multilevel optical signal acquired by multiplexing the first optical signal and the second optical signal between which the phase difference is provided, and apply photoelectric conversion to the portion; and a first controller configured to provide a first bias voltage and a second bias voltage to the first waveguide and the second waveguide, respectively, based on an output signal from the photodetector, wherein the first controller comprises:

a signal amplitude detector configured to receive an output of the photodetector and output signal amplitude information of the output of the photodetector; and a second controller configured to input the signal amplitude information and correcting at least one of the first bias voltage to be provided to the first waveguide and the second bias voltage to be provided to the second waveguide, based on a quadrature state between the first waveguide and the second waveguide of the optical modulator, the quadrature state being represented by the signal amplitude information.

2. The optical transmission device according to claim 1, wherein the first controller further comprises:

an oscillator configured to output a signal having a predetermined relatively low frequency; and a bias circuit configured to superimpose the signal output from the oscillator on a direct-current voltage to generate the first bias voltage and the second bias voltage, wherein the signal amplitude detector comprises envelope detector configured to detect an envelope of a signal input into the signal amplitude detector, and wherein the second controller extracts a signal component output from the oscillator by using an envelope detection signal from the envelope detector, and corrects one or both of the first bias voltage and the second bias voltage, based on information about at least one of intensity or a phase of the extracted signal component output from the oscillator.

3. The optical transmission device according to claim 1, wherein the signal amplitude detector further comprises an RMS detector configured to generate a root mean square value of a signal input into the signal amplitude detector, and the second controller further inputs the root mean square value from the RMS detector and limits changes in an output of one or both of the first bias voltage and the second bias voltage, based on the root mean square value.

4. The optical transmission device according to claim 2, wherein the signal amplitude detector further comprises an RMS detector configured to generate a root mean square value of a signal input into the signal amplitude detector;

the second controller inputs the root mean square value from the RMS detector in addition to the envelope detection signal from the envelope detector; and at least one of information about intensity or a phase of the envelope detection signal and the root mean square value is used at the phase shifter to control a phase between a first optical signal output from the first waveguide and a second optical signal output from the second waveguide.

5. The optical transmission device according to claim 4, wherein the bias circuit further generates a third bias voltage by superimposing an output signal of the oscillator onto a direct-current voltage and the third bias voltage is provided to the phase shifter.

6. The optical transmission device according to claim 4, wherein the first controller further comprises:

an amplifier configured to receive an output signal of the photodetector;

a filter configured to receive an output of the amplifier and selectively pass a signal having a predetermined frequency;

a first synchronous detector configured to synchronously detect a signal that has passed through the filter; and second synchronous detector configured to synchronously detect the envelope detection signal from the envelope detector, wherein the signal amplitude detector inputs an output signal of the amplifier, and wherein the second controller comprises:

a noise component detector configured to input the root mean square value from the RMS detector and the envelope detection signal synchronously detected by the second synchronous detector, and output a noise component signal;

a noise removing circuit configured to input an output from the first synchronous detector as a control signal for generating a bias voltage, input the noise component signal from the noise component detector, remove noise from the control signal and providing the control signal to the bias circuit; and a quadrature skew detector configured to provide a signal resulting from filtering of a noise component signal generated by the noise component detector, based on the envelope detection signal to the bias circuit.

7. The optical transmission device according to claim 6, wherein the first controller further comprises a time-division circuit configured to superimpose a signal from the oscillator onto at least the first bias voltage and the second bias voltage from the bias circuit and providing a resulting signal to the first waveguide and the second waveguide in a time-division manner.

8. A method of controlling an optical transmission device, the method performing control to:

separately modulate light propagating through a first waveguide of an optical modulator and light propagating through a second waveguide of the optical modulator by using a modulation drive signal having multiple intensity levels;

provide a predetermined phase difference between a first optical signal output from the first waveguide and a second optical signal output from the second waveguide;

detect a portion of a multilevel optical signal acquired by multiplexing the first optical signal and the second optical signal between which the phase difference is provided and apply photoelectric conversion to the portion; and provide a bias voltage to the optical modulator, based on a signal resulting from the photoelectric conversion, wherein the method comprises:

acquiring signal amplitude information of the signal resulting from the photoelectric conversion, and correcting at least one of a first bias voltage to be provided to the first waveguide and a second bias voltage to be provided to the second waveguide, based on a quadrature state between the first waveguide and the second waveguide, the quadrature state being represented by the signal amplitude information.

9. The method of controlling an optical transmission device according to claim 8, comprising:

generating a predetermined signal having a predetermined relatively low frequency;

superimposing the generated signal having the relatively low frequency to a direct-current voltage to generate the first bias voltage and the second bias voltage;

performing envelope detection to acquire an envelope detection signal from the signal resulting from photoelectric conversion; and extracting a signal component of the signal having the relatively low frequency by using the envelope detection signal, and correcting one or both of the first bias voltage and the second bias voltage, based on information about at least one of intensity or a phase of the extracted signal component.

10. The method of controlling an optical transmission device according to claim 8, comprising:

generating a root mean square value from the signal resulting from the photoelectric conversion; and limiting changes in an output of one or both of the first bias voltage and the second bias voltage, based on the root mean square value.

11. The optical transmission device according to claim 2, wherein the signal amplitude detector further comprises an RMS detector configured to generate a root mean square value of a signal input into the signal amplitude detector, and the second controller further inputs the root mean square value from the RMS detector and limits changes in an output of one or both of the first bias voltage and the second bias voltage, based on the root mean square value.

12. The optical transmission device according to claim 5, wherein the first controller further comprises:

an amplifier configured to receive an output signal of the photodetector;

a filter configured to receive an output of the amplifier and selectively pass a signal having a predetermined frequency; and a first synchronous detector configured to synchronously detect a signal that has passed through the filter; and second synchronous detector configured to synchronously detect the envelope detection signal from the envelope detector, wherein the signal amplitude detector inputs an output signal of the amplifier, and wherein the second controller comprises:

a noise component detector configured to input the root mean square value from the RMS detector and the envelope detection signal synchronously detected by the second synchronous detector, and output a noise component signal;

a noise removing circuit configured to input an output from the first synchronous detector as a control signal for generating a bias voltage, input the noise component signal from the noise component detector, remove noise from the control signal and providing the control signal to the bias circuit; and a quadrature skew detector configured to provide a signal resulting from filtering of a noise component signal generated by the noise component detector, based on the envelope detection signal to the bias circuit.

13. The optical transmission device according to claim 12, wherein the first controller further comprises a time-division circuit configured to superimpose a signal from the oscillator onto at least the first bias voltage and the second bias voltage from the bias circuit and providing a resulting signal to the first waveguide and the second waveguide in a time-division manner.

14. The method of controlling an optical transmission device according to claim 9, comprising:

generating a root mean square value from the signal resulting from the photoelectric conversion; and limiting changes in an output of one or both of the first bias voltage and the second bias voltage, based on the root mean square value.

* * * * *